United States Patent
Eirinberg et al.

(10) Patent No.: US 12,380,237 B2
(45) Date of Patent: Aug. 5, 2025

(54) PROTECTED DATA USE IN THIRD PARTY SOFTWARE APPLICATIONS

(71) Applicant: Snap Inc., Santa Monica, CA (US)

(72) Inventors: Dylan Shane Eirinberg, Venice, CA (US); David Evans, Los Angeles, CA (US); Adrian Jack Kant, Brooklyn, NY (US); Alexander R. Osborne, Los Angeles, CA (US); Matthew Saunders, Toronto (CA); William Wu, Marina del Rey, CA (US)

(73) Assignee: Snap Inc., Santa Monica, CA (US)

( * ) Notice: Subject to any disclaimer, the term of this patent is extended or adjusted under 35 U.S.C. 154(b) by 151 days.

(21) Appl. No.: 17/655,111

(22) Filed: Mar. 16, 2022

(65) Prior Publication Data

US 2023/0297714 A1    Sep. 21, 2023

(51) Int. Cl.
*H04L 29/06* (2006.01)
*G06F 21/53* (2013.01)
(Continued)

(52) U.S. Cl.
CPC .......... *G06F 21/6245* (2013.01); *G06F 21/53* (2013.01); *G06F 21/604* (2013.01); *G06F 2221/2115* (2013.01)

(58) Field of Classification Search
CPC .... G06F 21/6245; G06F 21/53; G06F 21/604; G06F 2221/2115; G06F 2221/2141; G06F 2221/2149; G06F 12/0837; G06F 18/40; G06F 21/12; G06F 21/51; G06F 40/197; G06F 2201/865; G06F 2221/032; G06F 7/64; G06F 2209/482; G06F 3/062;
(Continued)

(56) References Cited

U.S. PATENT DOCUMENTS

2015/0347784 A1* 12/2015 Keen .............. H04L 67/12
                                                    726/28
2017/0076103 A1* 3/2017 Chen .............. G06F 21/51
(Continued)

FOREIGN PATENT DOCUMENTS

WO        2018023368        2/2018
WO    WO-2023178148 A1    9/2023

OTHER PUBLICATIONS

"International Application Serial No. PCT US2023 064394, International Search Report mailed Jun. 15, 2023", 3 pgs.
(Continued)

*Primary Examiner* — Joseph P Hirl
*Assistant Examiner* — Leynna Truvan
(74) *Attorney, Agent, or Firm* — Schwegman Lundberg & Woessner, P.A.

(57) ABSTRACT

Various embodiments provide systems, methods, devices, and instructions for protected data use in a third-party software application, where use can be enabled while maintaining protection of the protected data from the third party software application. In particular, various embodiments provide a software application architecture that permits a data party that owns or maintains protected data to support a software development ecosystem where a third-party can develop a third-party software application that uses the protected data while denying the third-party access to the protected data.

20 Claims, 10 Drawing Sheets

(51) Int. Cl.
*G06F 21/60* (2013.01)
*G06F 21/62* (2013.01)

(58) Field of Classification Search
CPC ........... G06F 17/2205; G06F 17/30312; G06F 16/00; H04L 63/10; H04L 12/2689; H04L 29/08981; H04L 45/56; H04L 43/14; H04L 49/9094; H04W 12/37; G09B 21/005; G05D 2201/00; H03M 7/702; H04N 21/23617; H04N 21/2541; H04N 21/25833; H04N 21/25858; H04N 1/00148; H04N 1/0097; H04N 21/433; H04N 2201/3274; H04Q 3/54575; G05B 2219/13195; G07B 2017/00403; G11B 23/28
See application file for complete search history.

(56) References Cited

U.S. PATENT DOCUMENTS

| | | | |
|---|---|---|---|
| 2017/0199883 A1* | 7/2017 | Terry | G06F 21/00 |
| 2018/0351941 A1* | 12/2018 | Chhabra | H04L 63/08 |
| 2021/0240818 A1 | 8/2021 | Seksenov et al. | |
| 2021/0383373 A1 | 12/2021 | Eirinberg et al. | |

OTHER PUBLICATIONS

"International Application Serial No. PCT US2023 064394, Written Opinion mailed Jun. 15, 2023", 7 pgs.
"U.S. Appl. No. 17/655,111, Response filed May 28, 2024 to Non Final Office Action mailed Feb. 26, 2024", 11 pgs.
"International Application Serial No. PCT/US2023/064394, International Preliminary Report on Patentability mailed Sep. 26, 2024", 9 pgs.

* cited by examiner

PROTECTED DATA USE IN THIRD PARTY SOFTWARE APPLICATIONS

TECHNICAL FIELD

Embodiments described herein relate to augmented reality and, more particularly, but not by way of limitation, to systems, methods, devices, and instructions for protected data use in a third-party software application.

BACKGROUND

A company or organization storing data about, or created by, its users may wish to permit third parties (e.g., third party developers) use of that data in a software application (e.g., software service) that the third party develops to build or enhance other software services. For instance, a third party can develop a third-party software application, such as a software plug-in or embedded software component, that uses user data from a company or organization to enhance a software application from that the company or organization. Traditionally, various authorization mechanisms are used by a data resource holder (e.g., company or organization) to obtain permissions from its users to share data with third parties and, based on those permissions, the user data can be shared with the third party. Typically, the data resource holder allows its users to revoke such permissions. Traditional methods of user data sharing mechanisms involve the user data actually being shared with a third party in order for that the third party software application to make use of it. Once the user data is shared, it is usually in the possession of the third party and can remain as such even after a user revokes permission for use of their user data by the third party.

BRIEF DESCRIPTION OF THE DRAWINGS

In the drawings, which are not necessarily drawn to scale, numerals may describe similar components in different views. To easily identify the discussion of any particular element or act, the most significant digit or digits in a reference number refer to the figure number in which that element is first introduced. Some nonlimiting examples are illustrated in the figures of the accompanying drawings in which.

DETAILED DESCRIPTION

Figure 1:
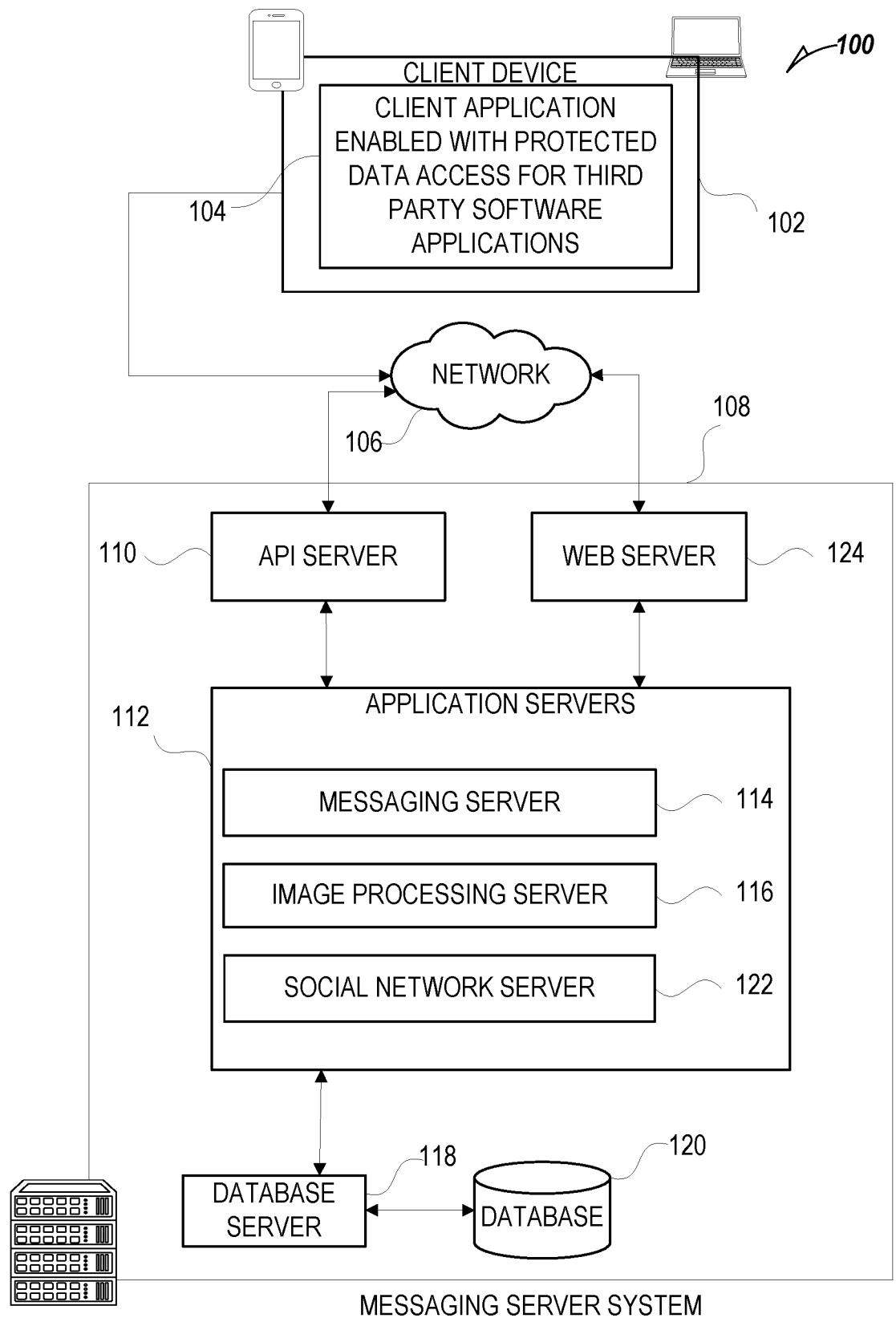
FIG. 1 is a block diagram representing a networked environment in which the present disclosure may be deployed, in accordance with some embodiments.

Various embodiments provide systems, methods, devices, and instructions for protected data use in a third-party software application, where use can be enabled while maintaining (e.g., controlling or securing) protection of the protected data from the third-party software application. In particular, various embodiments provide a software application architecture that permits an owner of protected data to support a software development ecosystem where a third-party can develop a third-party software application that uses the protected data while denying the third-party access to the protected data.

For example, an embodiment can permit a software developer (e.g., a third party) to create a third-party software application that provides a social experience to a user using the user's social networking data (e.g., the user's friend relationships or the user's friends list) by way of a private software component, without providing the software developer access or possession of the user's social networking data. For instance, within the third-party software application, the private software component can enable sharing of data across conversations between friends on a social network without providing the software developer (or the third-party software application) access or possession of a conversation identifier associated with the conversation. Additionally, within the third-party software application, the private software component can enable the user's social networking data to be used in connection with external accounts or data (e.g., accounts or data associated with the third party), while maintaining protection of the user's social networking data.

According to some embodiments, a system (e.g., client system) is provided that comprises a private data storage and a protected data storage, where a container software application is executed on the system (e.g., in a container software environment, such as an operating system on the system), where a third-party software application is executed in a sandbox environment of the container software application implementing a public software environment, and where a private software component is executed in a sandbox environment of the third-party software application that implements a private software environment. For various embodiments, the system is configured such that the private data storage provides read and write data access to a private software environment, and private data storage provides write-only data access to the public software environment. In various embodiments, the system is configured such that the protected data storage provides read and write data access to the container software application, and read-only data access to the private software environment while denying all data access to the public software environments. In this way, the protected data storage of the system can store protected data that can be accessed (e.g., read or written) by the container software application, and can be accessed (e.g., read or used) by the private software component (from in the third-party software application) for the benefit of the third party software application while preventing the third-party software application from having any data access or possession of the protected data. Additionally, for some embodiments, the system is configured such that the private data storage provides read and write data access to the private software environment, and provides write-only data access to the public software environment. In this way, the private data storage can enable the third-party software application to communicate data one-way to the private software component while preventing the third-party software application from having data access or possession of any private data the private software component may write to the private data storage. Depending on the embodiment, the system can form at least a part of a client device. In addition, the container software application can form at least part of a client software application, such as a social networking client or software application operating on a computing device (e.g., desktop computer or a mobile device), and the protected data can be associated with a user of the client software application, such as the user's social network data (e.g., graph data).

By use of various embodiments described herein, exfiltration of protected data (such as a user's friend relationship data) can be limited or prevented. Additionally, various embodiments prevent data being used by a private software component from being exported to a third party or a third-party software application.

As used herein, protected data can comprise data stored, possessed, or maintained by a data party, such as a company or organization (e.g., company operating a social network). According to various embodiments, the protected data can be used in a third-party software application by a private software component while the protected data is not shared (e.g., directly shared) with a third party associated with the third-party software application. An example of protected data can include, without limitation, social networking data for a user, such as graph data associated with the user or a social networking friend list for the user.

As used herein, a private data storage (or private storage) can comprise a database or a database application used to store data from a public software environment (e.g., public context) and a private software environment (e.g., private context). As used herein, private data refers to data stored on a private data storage. The private data can include, for example, data written (e.g., generated) by a third-party software application, such as in response to a user's interaction with the third-party software application. Additionally, the private data can include, for example, data read or written by a private software component, such as in response to a user's interaction with the private software component. According to some embodiments, the private software environment has read data access and write data access to the private data storage, and the public software environment has write data access to the private data storage, but has either limited or no read data access to the private data storage. For some embodiments, the private data storage is used by the public software environment, or one or more software applications executing therein (e.g., a third-party software application, to communicate data to the private software environment, or one or more software applications (e.g., a private software component) executing therein.

As used herein, a protected data storage (or protected storage) can comprise a database or a database application used to store protected data. As used herein, protected data refers to data stored on a protected data storage and intended to be protected from access or possession by a third-party software application. The private data can include, for example, data read or written by a container software application, such as in response to a user's interaction with the third-party software application. Protected data can be regarded as data owned or held by a data party. According to some embodiments, the protected data storage is read accessible from within a private software environment (e.g., private context) and not data accessible from within a public software environment (e.g., public context).

As used herein, a sandbox environment (or sandbox) can comprise an environment (e.g., a software execution environment) for executing one or more software applications such that one or more executing software applications have one or more limitations on access to an environment outside of the sandbox environment. The limitations can be controlled by the sandbox environment and not by the one or more executing applications. These limitations can include, without limitation, restricting access to store data, restricting access to memory locations, restricting access to network functionality, restricting access to specific network addresses, preventing access to some or all of an operating system or application program interfaces (APIs) (e.g., local device APIs), and the like.

As used herein, a third-party software application can comprise a software application developed or created by a third party. According to some embodiments, a third-party software application provides a software service to a user that uses protected data (e.g., social networking data associated with the user, such as the user's friend list).

As used herein, a public software environment (e.g., public context) comprises a software environment configured to operate a software application, such as a third-party software application that can be authored by a third party, or a third-party software component (e.g., public software component). As used herein, a private software environment (e.g., private context) comprises a software environment configured to operate a software application, such as a private software component, that can access protected data (e.g., social networking user data) and that can output (e.g., render) graphics to the display of a client device.

As used herein, third party application data can comprise data that is created or used by a third-party software application as described herein. As used herein, a third party (or third party developer) comprises an individual or entity that develops or creates a third party software application as described herein. For various embodiments, the third party develops or creates a third-party software application that uses protected data via a protected software component but does not provide the third party with direct access to (or provide the third-party software application with possession of) the protected data.

As used herein, a private software component can comprise a software component that can access and make use of protected data (e.g., provided by a third party) from in a third-party software application without sharing the protected data with, or providing possession of the protected data to a third party software application. An element of a private software component can include interface elements, such as user interface elements, that enable use of protected data through the private software component. Additionally, the one or more elements of the private software component can be developed or created by a data party for use by a third party to develop or create the private software component for use in a third-party software application. For some embodiments, a private software component is executed in a private software environment (e.g., private context) in a third-party software application.

As used herein, a container software application comprises a software application (e.g., developed or created by a data party that owns or holds protected data) configured to execute a third-party software in a sandbox environment of the container software application. An example of a container software application can include, without limitation, a social network software application that comprises a sandbox environment to execute a third party software application in the social network software application. The third party software application can, for instance, be configured to provide a software service that makes use of a user's social networking data via a private software component executing in the third-party software application.

As used herein, a container software environment (e.g., container context) can comprise a software environment that is configured to operate a container software application. Examples of a container software environment can include, without limitation, an operating system of a computing device (e.g., desktop computer, laptop, or a mobile device).

As used herein, a data party comprises an individual entity that owns, stores, holds or otherwise maintains protected data. A data party can include a data owner, a data holder, or a data maintainer. For some embodiments, the data party develops or creates the container software application. A data party can provide a set of software tools (e.g., APIs or SDKs) that a third party can use in developing a private software component that makes used of protected data owned, stored, or maintained by the data party.

As used herein, an inline frame (or iframe) can comprise an element of a first document that can load a second document in the first document, where the element is configured to (e.g., capable of) operate as a sandbox or a virtual machine for a software application of the second document, and where the second document (e.g., software application thereof) cannot access elements of the first document (e.g., parent frame). For instance, the first document can comprise a HyperText Markup Language (HTML) document, and the second document can comprise a document (e.g., script file) with executable code, such as JavaScript code. In accordance with various embodiment described herein, a first document associated with a container software application comprises (e.g., includes) an iframe that loads a second document, where the second document is associated with a third-party software application. According to various embodiments, the second document comprises (e.g., includes) another iframe that loads a third document associated with a private software component, and that can operate as a sandbox or virtual machine for the private software component as described herein.

The description that follows includes systems, methods, techniques, instruction sequences, and computing machine program products that embody illustrative embodiments of the disclosure. In the following description, for the purposes of explanation, numerous specific details are set forth in order to provide an understanding of various embodiments. It will be evident, however, to those skilled in the art, that embodiments may be practiced without these specific details. In general, well-known instruction instances, protocols, structures, and techniques are not necessarily shown in detail.

Reference will now be made in detail to embodiments of the present disclosure, examples of which are illustrated in the appended drawings. The present disclosure may, however, be embodied in many different forms and should not be construed as being limited to the embodiments set forth herein.

FIG. 1 is a block diagram representing a networked environment in which the present disclosure may be deployed, in accordance with some embodiments. In particular, the block diagram shows an example system 100 for exchanging data (e.g., messages and associated content) over a network, where the system 100 includes a client application enabled with protected data access for third party software applications 104 (hereafter, client application 104), in accordance with some embodiments. The system 100 can include multiple instances of a client device 102, each of which hosts several applications, including the client application 104. The client application 104 is communicatively coupled to a messaging server system 108 via a network 106 (e.g., the Internet). The client application 104 can also communicate with applications locally hosted on the client device 102 using Applications Program Interfaces (APIs).

The client application 104 is able to communicate and exchange data, such as protected data described herein, with another client or with the messaging server system 108 via the network 106. The data exchanged between the client application 104 and the messaging server system 108 can include functions (e.g., commands to invoke functions) as well as payload data (e.g., text, audio, video or other multimedia data).

The messaging server system 108 provides server-side functionality via the network 106 to the client application 104. While certain functions of the system 100 are described herein as being performed by either the client application 104 or by the messaging server system 108, the location of certain functionality either within the client application 104 or the messaging server system 108 may be a design choice. For example, it may be technically preferable to initially deploy certain technology and functionality within the messaging server system 108, but to later migrate this technology and functionality to the client application 104 where a client device 102 has sufficient processing capacity.

The messaging server system 108 supports various services and operations that are provided to the client application 104. Such operations include transmitting data to, receiving data from, and processing data generated by the client application 104. This data may include message content, client device information, geolocation information, media augmentation and overlays, message content persistence conditions, social network information, and live event information, as examples. For various embodiments, data provided by the messaging server system 108 to the client application 104 can be considered protected data; this data is to be used by a private software component executing (e.g., operating) in a third-party software application that operates in the client application 104. Data exchanges in the system 100 are invoked and controlled through functions available via user interfaces (UIs) of the client application 104.

Turning now specifically to the messaging server system 108, where an Application Program Interface (API) server 110 is coupled to and provides a programmatic interface to application servers 112. The application servers 112 are communicatively coupled to a database server 118, which facilitates access to a database 120 that stores data associated with messages processed by the application servers 112. Similarly, a web server 124 is coupled to the application servers 112 and provides web-based interfaces to the application servers 112. To this end, the web server 124 processes incoming network requests over the Hypertext Transfer Protocol (HTTP) and several other related protocols.

The API server 110 receives and transmits message data (e.g., commands and message payloads) between the client device 102 and the application servers 112. Specifically, the API server 110 provides a set of interfaces (e.g., routines and protocols) that can be called or queried by the client application 104 in order to invoke functionality of the application servers 112. The API server 110 exposes various functions supported by the application servers 112, including account registration, login functionality, the sending of messages, via the application servers 112, from the client application 104 to another client application, the sending of media files (e.g., images or video) from the client application 104 to a messaging server 114, the addition and deletion of entities (e.g., friends) to an entity graph (e.g., a social graph), opening an application event (e.g., relating to the client application 104), and for possible access by the client application 104 or another client application. the retrieval of protected data in accordance with various embodiments. This protected data can include a collection of media data (e.g., story), the settings of a collection, a list of friends of a user of the client device 102, messages and content, and the location of friends in a social graph.

The application servers 112 host a number of server applications and subsystems, including for example a messaging server 114, an image processing server 116, and a social network server 122. The messaging server 114 implements several message processing technologies and functions, particularly related to the aggregation and other processing of content (e.g., textual and multimedia content) included in messages received from multiple instances of the client application 104. As will be described in further detail, the text and media content from multiple sources may be aggregated into collections of content (e.g., called stories or galleries). These collections are then made available to the client application 104. Other processor and memory intensive processing of data may also be performed server-side by the messaging server 114, in view of the hardware requirements for such processing.

The application servers 112 also include the image processing server 116 that is dedicated to performing various image processing operations, typically with respect to images or video within the payload of a message sent from or received at the messaging server 114.

The social network server 122 supports various social networking functions and services and makes these functions and services available to the messaging server 114. To this end, the social network server 122 maintains and accesses protected data, such an entity graph that facilitates social networking functions and services, in the database 120. Examples of functions and services supported by the social network server 122 include the identification of other users of the system 100 with which a particular user has relationships or is "following," as well as the identification of other entities and interests of a particular user.

Returning to the client application 104, features and functions of an external resource (e.g., another application or applet) are made available to a user via an interface of the client application 104. In this context, "external" refers to the fact that the other application or applet is separate from the client application 104, which can be executed external to or in the client application 104. For various embodiments, an external resource is executed as a third-party software application in a sandbox environment of the client application 104. Additionally, for some embodiments, another external resource is executed as a private software component in a sandbox environment of the third-party software application.

The external resource, such as a third-party software application or a private software component as described herein, can be provided by a third party but may be provided by the creator or provider of the client application 104. For instance, a private software component can be provided by the creator or provider of the client application 104, or developed by a third party using software tools or libraries (e.g., APIs or SDKs) provided by the creator/provider. Depending on the embodiment, the client application 104 can receive a user selection of an option to launch or access features of such an external resource.

The external resource may be another application installed on the client device 102 (e.g., a "native app"), or a small-scale version of the application (e.g., an "applet") that is hosted on the client device 102 or remote of the client device 102 (e.g., on third-party servers). The small-scale version of the application includes a subset of features and functions of the application (e.g., the full-scale, native version of the application) and is implemented using a markup-language document. In one example, the small-scale version of the application (e.g., an "applet") is a web-based, markup-language version of the application and is embedded in the client application 104. In addition to using markup-language documents (e.g., a.*ml file), an applet may incorporate a scripting language (e.g., a.*js file or a .json file) and a style sheet (e.g., a.*ss file).

In response to receiving a user selection of the option to launch or access features of the external resource, the client application 104 determines whether the selected external resource is a web-based external resource or a locally installed application. In some cases, applications that are locally installed on the client device 102 can be launched in the client application 104 (e.g., a third-party software application or a private software component of an embodiment) or independently of and separately from the client application 104, such as by selecting an icon, corresponding to the application, on a home screen of the client device 102. Small-scale versions of such applications can be launched or accessed via the client application 104 and, in some examples, no portion or limited portions of the small-scale application can be accessed outside of the client application 104. The small-scale application can be launched by the client application 104 as it is receiving, from a third-party server, for example, a markup-language document associated with the small-scale application and processing of such a document.

In response to determining that the external resource is a locally installed application, the client application 104 instructs the client device 102 to launch the external resource by executing locally stored code corresponding to the external resource, such as in a sandbox environment of the client application 104 of some embodiments. In response to determining that the external resource is a web-based resource, the client application 104 communicates with the third-party servers (for example) to obtain a markup-language document corresponding to the selected external resource. The client application 104 then processes the obtained markup-language document to present the web-based external resource in a user interface of the client application 104.

The client application 104 can notify a user of the client device 102, or other users related to such a user (e.g., "friends"), of activity taking place in one or more external resources. For example, the client application 104 can provide participants in a conversation (e.g., a chat session) within the client application 104 with notifications relating to the current or recent use of an external resource by one or more members of a group of users. One or more users can be invited to join in an active external resource or to launch a recently used but currently inactive (in the group of friends) external resource. The external resource can provide participants in a conversation, each using respective client applications, with the ability to share an item, status, state, or location in an external resource with one or more members of a group of users into a chat session. The shared item may be an interactive chat card with which members of the chat can interact, for example, to launch the corresponding external resource, view specific information in the external resource, or take the member of the chat to a specific location or state in the external resource. Within a given external resource, response messages can be sent to users on the client application 104. The external resource can selectively include different media items in the responses, based on a current context of the external resource.

The client application 104 can present a list of the available external resources (e.g., applications or applets) to a user to launch or access a given external resource. This list can be presented in a context-sensitive menu. For example, the icons representing different ones of the applications (or applets) can vary based on how the menu is launched by the user (e.g., from a conversation interface or from a non-conversation interface).

The client application 104 implements various embodiments described herein. According to various embodiments, the client application 104 enables use of protected data in a third-party software application while maintaining (e.g., controlling or securing) protection of the protected data from the third party software application. In particular, the client application 104 of some embodiments executes a third party software application in a sandbox environment of the client application 104, where a private software component is executed in a sandbox environment of the third party software application, and where the private software component is configured to access (e.g., use) the protected data on behalf (e.g., for the benefit of) the third party software application while preventing the third party software application from accessing (e.g., using or gaining possession) of the protected data.

Figure 2:
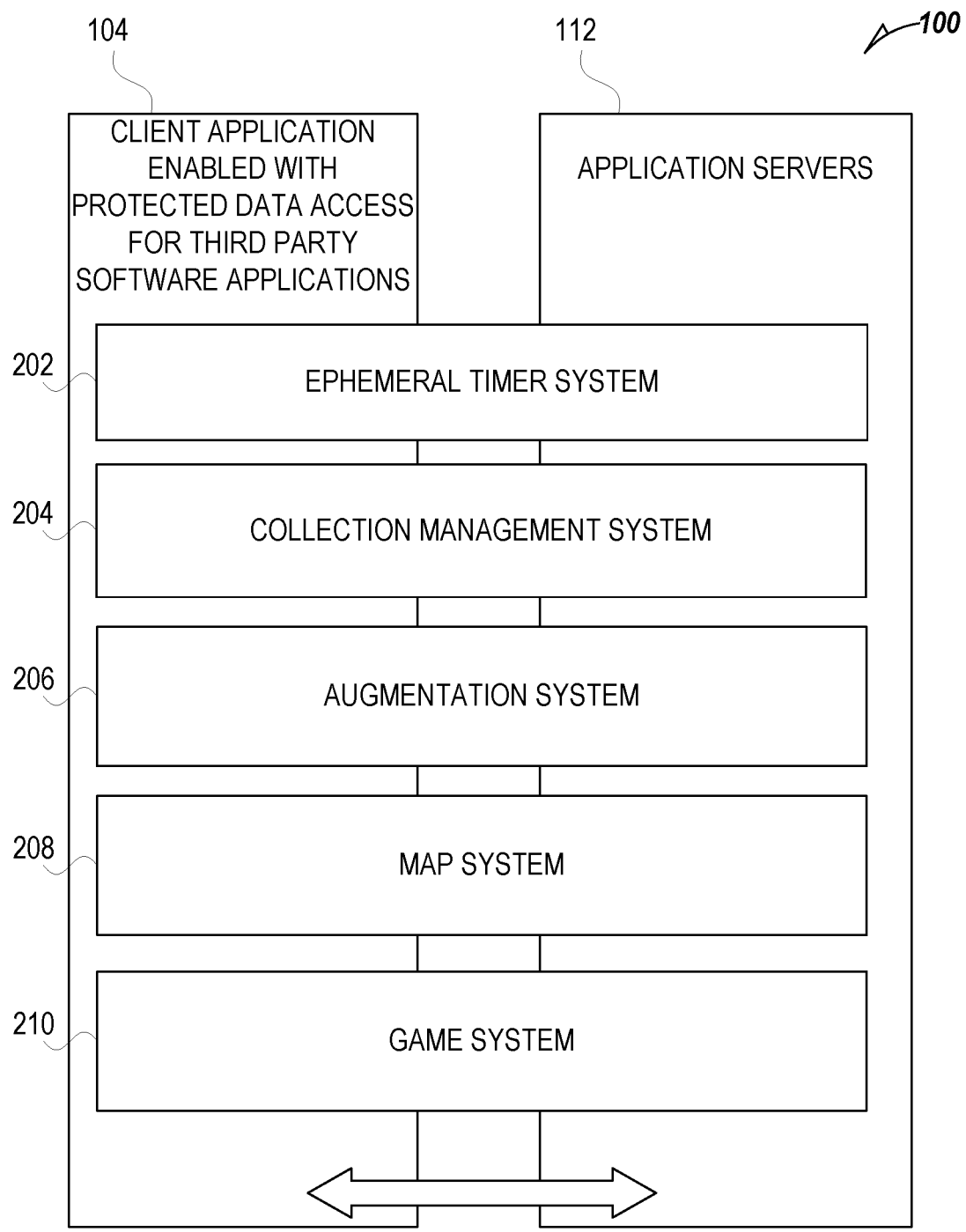
FIG. 2 is a block diagram illustrating details regarding a system, in accordance with some embodiments.

FIG. 2 is a block diagram illustrating further details regarding the system 100 of FIG. 1, in accordance with some embodiments. Specifically, the system 100 is shown to comprise the client application 104 and the application servers 112. The system 100 embodies a number of subsystems, which are supported on the client-side by the client application 104 and on the server-side by the application servers 112. These subsystems include, for example, an ephemeral timer system 202, a collection management system 204, an augmentation system 206, a map system 208, and a game system 210. Depending on the embodiment, at least some portion of the ephemeral timer system 202, the collection management system 204, the augmentation system 206, the map system 208, the game system 210, or the external resource system 214, or protected data provided therefrom, can be accessed or used by a private software component that is executing (e.g., operating) in a sandbox of a third party software application, where the third-party software application is executing (e.g., operating) in a sandbox of client application 104.

The ephemeral timer system 202 is responsible for enforcing the temporary or time-limited access to content by the client application 104 and the messaging server 114. The ephemeral timer system 202 incorporates a number of timers that, based on duration and display parameters associated with a message, or collection of messages (e.g., a story), selectively enable access (e.g., for presentation and display) to messages and associated content via the client application 104. Further details regarding the operation of the ephemeral timer system 202 are provided below.

The collection management system 204 is responsible for managing sets or collections of media (e.g., collections of text, image video, and audio data). A collection of content (e.g., messages, including images, video, text, and audio) may be organized into an "event gallery" or an "event story." Such a collection may be made available for a specified time period, such as the duration of an event to which the content relates. For example, content relating to a music concert may be made available as a "story" for the duration of that music concert. The collection management system 204 may also be responsible for publishing an icon that provides notification of the existence of a particular collection to the user interface of the client application 104.

The augmentation system 206 provides various functions that enable a user to augment (e.g., annotate or otherwise modify or edit) media content associated with a message. For example, the augmentation system 206 provides functions related to the generation and publishing of media overlays for messages processed by the system 100. The augmentation system 206 operatively supplies a media overlay or augmentation (e.g., an image filter) to the client application 104 based on a geolocation of the client device 102. In another example, the augmentation system 206 operatively supplies a media overlay to the client application 104 based on other information, such as social network information of the user of the client device 102. A media overlay may include audio and visual content and visual effects. Examples of audio and visual content include pictures, texts, logos, animations, and sound effects. An example of a visual effect includes color overlaying. The audio and visual content or the visual effects can be applied to a media content item (e.g., a photo) at the client device 102. For example, the media overlay may include text or image that can be overlaid on top of a photograph taken by the client device 102. In another example, the media overlay includes an identification of a location overlay (e.g., Venice beach), a name of a live event, or a name of a merchant overlay (e.g., Beach Coffee House). In another example, the augmentation system 206 uses the geolocation of the client device 102 to identify a media overlay that includes the name of a merchant at the geolocation of the client device 102. The media overlay may include other indicia associated with the merchant. The media overlays may be stored in the database 120 and accessed through the database server 118.

In some examples, the augmentation system 206 provides a user-based publication platform that enables users to select a geolocation on a map and upload content associated with the selected geolocation. The user may also specify circumstances under which a particular media overlay should be offered to other users. The augmentation system 206 generates a media overlay that includes the uploaded content and associates the uploaded content with the selected geolocation.

In other examples, the augmentation system 206 provides a merchant-based publication platform that enables merchants to select a particular media overlay associated with a geolocation via a bidding process. For example, the augmentation system 206 associates the media overlay of the highest bidding merchant with a corresponding geolocation for a predefined amount of time.

The map system 208 provides various geographic location functions and supports the presentation of map-based media content and messages by the client application 104 of FIG. 1. For example, the map system 208 enables the display of user icons or avatars (e.g., stored in profile data) on a map to indicate a current or past location of "friends" of a user, as well as media content (e.g., collections of messages including photographs and videos) generated by such friends, in the context of a map. For example, a message posted by a user to the system 100 from a specific geographic location may be displayed within the context of a map at that location to "friends" of a specific user on a map interface of the client application 104. A user can furthermore share his or her location and status information (e.g., using an appropriate status avatar) with other users of the system 100 via the client application 104, with this location and status information being similarly displayed within the context of a map interface of the client application 104 to selected users.

The game system 210 provides various gaming functions within the context of the client application 104. The client application 104 provides a game interface that provides a list of available games that can be launched by a user within the context of the client application 104 and played with other users of the system 100. The system 100 further enables a particular user to invite other users to participate in the play of a specific game, by issuing invitations to such other users from the client application 104. The client application 104 also supports both the voice and text messaging (e.g., chats) within the context of gameplay, provides a leaderboard for the games, and supports the provision of in-game rewards (e.g., coins and items).

Each third-party server hosts, for example, a markup language (e.g., HTML5) based application or small-scale version of an application (e.g., game, utility, payment, or ride-sharing application). The client application 104 may launch a web-based resource (e.g., application) by accessing the HTML5 file from the third-party servers associated with the web-based resource. In certain examples, applications hosted by third-party servers are programmed in JavaScript leveraging a Software Development Kit (SDK) provided by the messaging server 114. The SDK includes Application Programming Interfaces (APIs) with functions that can be called or invoked by the web-based application. In certain examples, the messaging server 114 includes a JavaScript library that provides a given external resource access to certain user data of the client application 104. HTML5 is used as an example technology for programming games, but applications and resources programmed based on other technologies can be used.

In order to integrate the functions of the SDK into the web-based resource, the SDK is downloaded by a third-party server from the messaging server 114 or is otherwise received by the third-party server. Once downloaded or received, the SDK is included as part of the application code of a web-based external resource. The code of the web-based resource can then call or invoke certain functions of the SDK to integrate features of the client application 104 into the web-based resource.

The SDK stored on the messaging server 114 effectively provides the bridge between an external resource (e.g., applications or applets and the client application 104. This provides the user with a seamless experience of communicating with other users on the client application 104, while also preserving the look and feel of the client application 104. To bridge communications between an external resource and a client application 104, in certain examples, the SDK facilitates communication between third-party servers and the client application 104. In certain examples, a Web ViewJavaScriptBridge running on a client device 102 establishes two one-way communication channels between an external resource and the client application 104. Messages are sent between the external resource and the client application 104 via these communication channels asynchronously. Each SDK function invocation is sent as a message and callback. Each SDK function is implemented by constructing a unique callback identifier and sending a message with that callback identifier.

By using the SDK, not all information from the client application 104 is shared with third-party servers. The SDK limits which information is shared based on the needs of the external resource. In certain examples, each third-party server provides an HTML5 file corresponding to the web-based external resource to the messaging server 114 of FIG. 1. The messaging server 114 can add a visual representation (such as a box art or other graphic) of the web-based external resource in the client application 104. Once the user selects the visual representation or instructs the client application 104 through a graphical user interface (GUI) of the client application 104 to access features of the web-based external resource, the client application 104 obtains the HTML5 file and instantiates the resources necessary to access the features of the web-based external resource.

The client application 104 presents a graphical user interface (e.g., a landing page or title screen) for an external resource. During, before, or after presenting the landing page or title screen, the client application 104 determines whether the launched external resource has been previously authorized to access user data of the client application 104. In response to determining that the launched external resource has been previously authorized to access user data of the client application 104, the client application 104 presents another graphical user interface of the external resource that includes functions and features of the external resource. In response to determining that the launched external resource has not been previously authorized to access user data of the client application 104, after a threshold period of time (e.g., 3 seconds) of displaying the landing page or title screen of the external resource, the client application 104 slides up (e.g., animates a menu as surfacing from a bottom of the screen to a middle of or other portion of the screen) a menu for authorizing the external resource to access the user data. The menu identifies the type of user data that the external resource will be authorized to use. In response to receiving a user selection of an accept option, the client application 104 adds the external resource to a list of authorized external resources and allows the external resource to access user data from the client application 104. In some examples, the external resource is authorized by the client application 104 to access the user data in accordance with an OAuth 2 framework.

The client application 104 controls the type of user data that is shared with external resources based on the type of external resource being authorized. For example, external resources that include full-scale applications are provided with access to a first type of user data (e.g., only two-dimensional avatars of users with or without different avatar characteristics). As another example, external resources that include small-scale versions of applications (e.g., web-based versions of applications) are provided with access to a second type of user data (e.g., payment information, two-dimensional avatars of users, three-dimensional avatars of users, and avatars with various avatar characteristics). Avatar characteristics include different ways to customize a look and feel of an avatar, such as different poses, facial features, clothing, and so forth.

Figure 3:
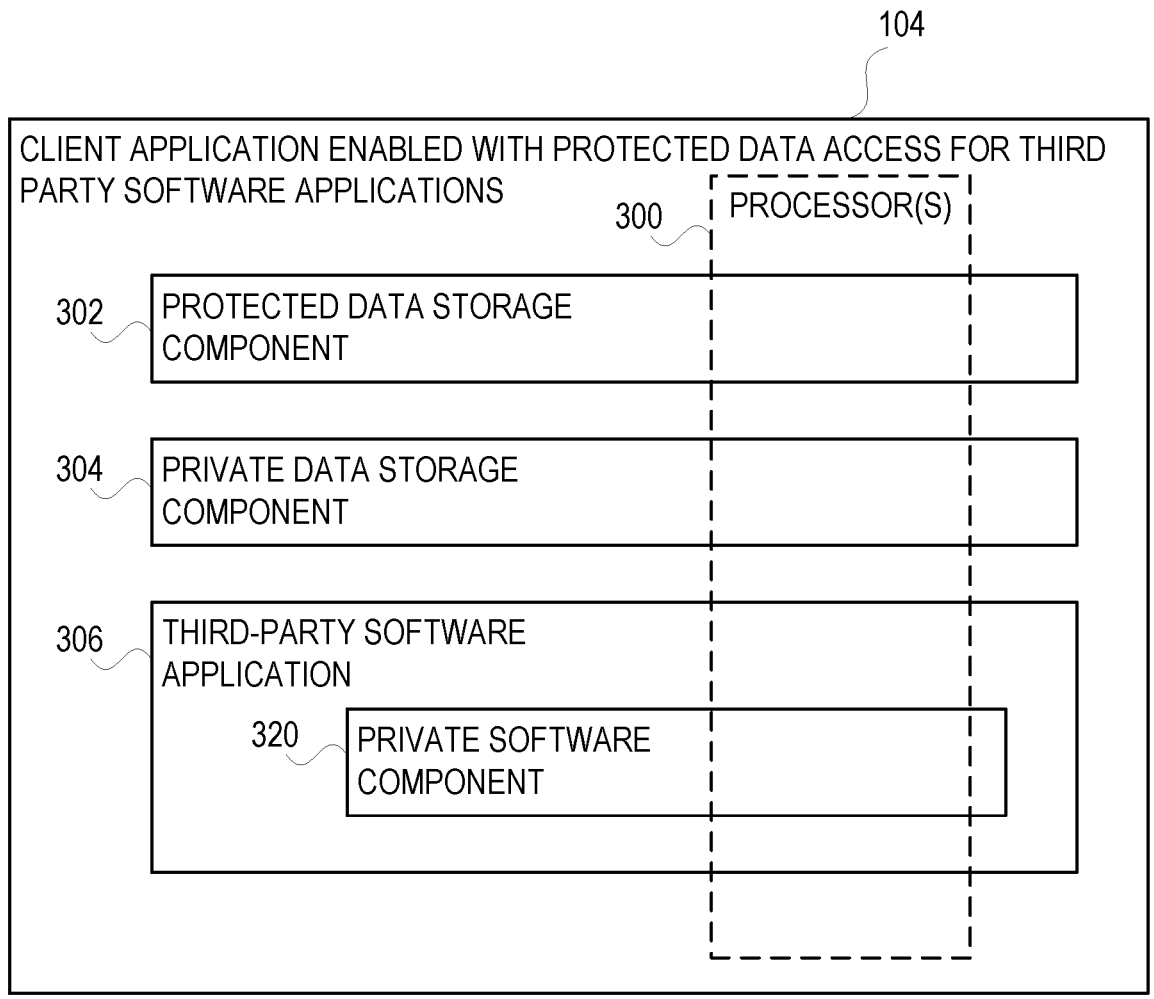
FIG. 3 is a block diagram illustrating an example implementation of a client application that enables protected data use in a third party software application, in accordance with some embodiments.

FIG. 3 is a block diagram illustrating an example implementation of the client application 104 that enables protected data use in a third-party software application, in accordance with some embodiments. The client application 104 is shown to comprise a protected data storage component 302 to implement or otherwise facilitate access to a protected data storage (e.g., storage space or storage device), a private data storage component 304 to implement or otherwise facilitate access to a private data storage (e.g., storage space or storage device), and a third-party software application 306, which executes a private software component 320 in a sandbox of the third party software application. For various embodiments, the components and arrangement of components of the client application 104 can vary from what is illustrated in FIG. 3. Any components of the client application 104 can be implemented using one or more processors (e.g., by configuring such one or more computer processors to perform functions described for that component) and hence can include one or more of the processors. Furthermore, according to various embodiments, any of the components illustrated in FIG. 3 can be implemented together or separately within a single machine, database, or device or may be distributed across multiple machines, databases, or devices. For example, either private data storage, protected data storage, or both can be implemented by one or more databases (e.g., databases 120) or datastores. For various embodiments described herein, the client application 104 comprises or otherwise operates as a container software application within which the third-party software application 306 can be executed (e.g., operated).

Figure 4:
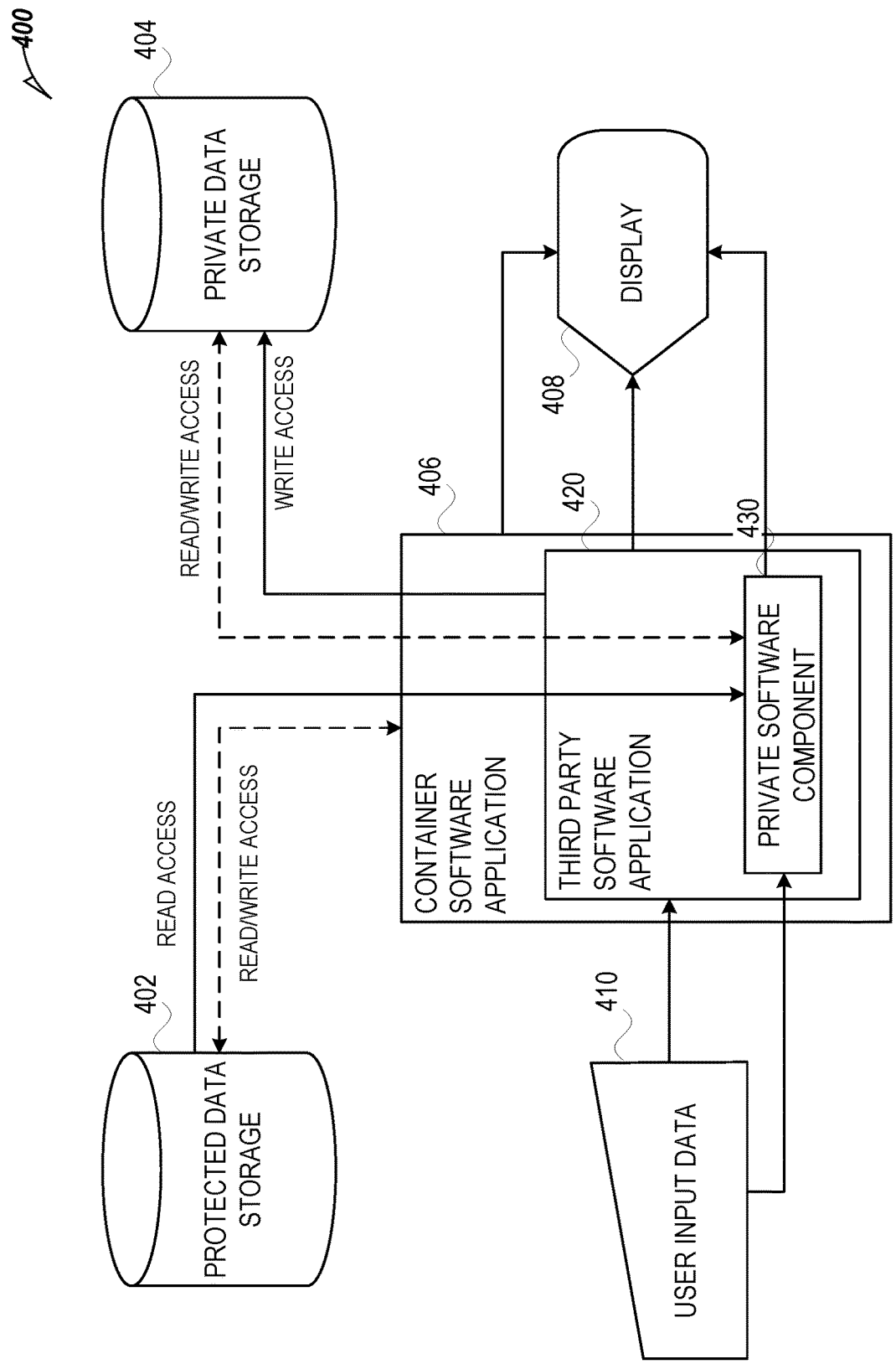
FIG. 4 is a block diagram illustrating an example system that enables protected data use in a third party software application, in accordance with some embodiments.

FIG. 4 is a block diagram illustrating an example system 400 that enables protected data use in a third-party software application, in accordance with some embodiments. The system 400 as shown comprises a protected data storage 402, a private data storage 404, a container software application 406, and a display 408 of a computing device (e.g., of the client device 102). The system 400 can represent an architecture where multiple environments (e.g., container, public, and private software environments) are used to execute the container software application 406, the third party software application 420, and the private software component 430. For some embodiments, two or more private software components can execute (e.g., operate) in parallel within the third party software application 420, and two or more third-party software applications can execute (e.g., operate) in parallel within the container software application 406.

User input data 410 can comprise one or more user inputs received by a computing device by way of a hardware or software user interface, such as a graphical user interface presented on the display 408 or a human interface device (HID) coupled to or included by the computing device. As shown, the user input data can be received by the container software application 406, the third party software application 420, and the private software component 430. Additionally, one or more of the container software applications 406, the third party software application 420, and the private software component 430 can output, or cause output of, data or information (e.g., graphical user interface with one or more elements) to the display 408. For some embodiments, the container software application 406 comprises a display mechanism capable of compositing output data from two or more of the container software applications 406, the third party software application 420, and the private software component 430 to render an output on the display 408.

In FIG. 4, a data party can own, build, or maintain the container software application 406. The container software application 406 can execute the third party software application 420 (which can be downloaded) inside a sandbox environment or virtual machine of the container software application 406, which represents a public software environment (e.g., public context). The public software environment can limit capabilities of the third party software application 420 by limiting, for example, one or more of the following: memory access, network access, and hardware access to features. The limits can be predefined by the container software application 406.

Aside from the limitations, the third party software application 420 can be configured to for general computation by running executable code authored by a third party and can display data to the end user via the display 408. The third party software application 420 can execute the private software component 430 inside a sandbox environment or virtual machine of the third party software application 420, which represents a private software environment (e.g., private context). The private software component 430 can be developed (e.g., coded) by the third party (e.g., the same third party as the third party software application 420) using a templating language configured with limited functionality defined by the container software application 406. The templating language can support the creation of an interactive program by the third party (that uses protected data) but that does not permit execution of arbitrary code. The private software component 430 can be generated (e.g., compiled) by converting, compiling or transpiling the authored templating language into software code that can be executed inside the private software environment. Communication from the public software environment to the private software environment can be supported, while reverse communication from the private software environment to the public software environment can be limited to specific events (such as user or a pre-defined timer). Additionally, any data that is included in the communication from the private software environment to the public software environment can be predefined at the time that the template defining the private software component 430 is compiled into executed code. In this way, the private software component 430 can be prevented from leaking data (e.g., protected data) from the private software environment to the public software environment. The infrastructure presented by FIG. 4 can enable a third party to develop the following: the third party software application 420 using programming languages for application development, the third party to develop the private software component 430 using a templating language, and a data party to execute third party software application 420 and the private software component 430 (within the third party software application 420) with little or no risk of protected data or private data leaking to the third party software application 420 or the third party.

In various embodiments, the container software application 406 can represent a client software application (e.g., the client application 104), such as a client messaging application or a client social network application. Depending on the embodiment, the container software application 406 executes (e.g., operates) within a container software environment (e.g., container context). For some embodiments, the third party software application 420 executes (e.g., operates) within a public software environment (e.g., public context) of the container software application 406, such as a sandbox of the container software application 406. For some embodiments, the private software component 430 executes (e.g., operates) within a private software environment (e.g., private context) of the third party software application 420, such as a sandbox of the container software application 406. For example, the container software application 406 loads a first document (such as a HTML document), at which point the public software environment can comprise an iframe of the first document, the third party software application 420 can load a second document (such as another HTML document), the private software environment can comprise an iframe of the second document, and the private software component 430 can comprise JavaScript script document or JavaScript code. Each of the protected data storage 402, the private data storage 404, or both can be implemented by a data storage service, one or more databases (e.g., a single database with segregated storage space for the protected data storage 402 and the private data storage 404), or one or more datastores.

The third party software application 420 can be developed (e.g., created) by a third party to use a first set of APIs (e.g., public APIs) provided by an individual or entity (e.g., data party) developing (e.g., creating) the container software application 406, and the private software component 430. The third party software application 420 can be developed by the third party to use a second set of APIs (e.g., private APIs) provided by the individual or entity. For some embodiments, the first set of APIs is not capable of accessing or directly using protected data, while the second set of APIs is capable of accessing or using protected data on behalf of the third party software application 420 while preventing the third-party software application 420 from accessing or possessing the protected data.

For some embodiments, the private software component 430 is coded or developed (e.g., by a third party) using a templating language. In this way, the private software component 430 can be compiled from a template and then the executable version of the private software component 430 is placed (e.g., inserted) or launched within the third party software application 420. The templating language used to define the private software component 430 can be configured such that operations or functionality provided by the private software component 430 is limited (e.g., restricted or controlled), thereby ensuring that the private software component 430 operates or behaves as expected, especially with respect to access or use of protected data. For instance, the templating language can comprise a plurality of tags that can be used as code for defining the private software component 430 and compiled into templated executable code. For example, the templating language can comprise an HTML-like language that uses custom tags, attributes, or both to access a set of predefined functionalities (e.g., templated JavaScript functionality) or access one or more styling files. The compilation process can comprise one or more of the following operations: validate template that defines the private software component 430, where validation disallows or denies dangerous tags or invalid attributes; reject functionality (e.g., Cascade Style Sheet functionality) in the template that can facilitate exfiltration of protected data; compile tags in the template to templated JavaScript functionality; and organize resulting output (e.g., templated JavaScript functionality) into an executable component representing the private software component 430, which can be referenced by a third party software application (e.g., 420).

Depending on the embodiment, the code for the private software component 430 can be included in the code for the third party software application 420 and compiled together with the third party software application 420. Alternatively, the code for the private software component 430 can be compiled separate from (e.g., external to) the third party software application 420 and launched within the third party software application 420. For example, the private software component 430 can be compiled by the data party and then provided (e.g., served from one of the application servers 112) to the third party software application 420. In doing so, the data party can further ensure that the private software component 430 operates or behaves as expected, especially with respect to access or use of protected data.

The following Table 1 provides an example of code defining a private software component, such as the private software component 430.

TABLE 1

```
<private-component>
  <div class = "developer-defined-class">
    <h1>Hello World Text</h1>
    <storage-data-get key="reservations" ...>
      <each list="reservations" as="r">
        <h4>{{r.name}}</h4>
      </each>
    </storage-data-get>
  </div>
</private-component>
```

The following Table 2 provides example of code for inserting or launching a private software component (such as the private software component 430) in a third-party software application, such as the third party software application 420.

TABLE 2

```
const width = 500;
const height = 300;
addPrivateComponentToElement('component-a', 'new-id',
  'new-class',
  width, height, 'target-element');
```

Depending on embodiment, the third party software application 420, the private software component 430, or both, can use (e.g., call or reference) one or more premade network requests (e.g., shared network requests), such as a premade network request sent by the private software component 430 to retrieve or use protected data (e.g., a request by a user to share conversation with another user). A premade network request can be cached (e.g., cached responses to requests), proxied, or both, on one or more external servers (e.g., one or more of the application servers 112), which can speed up the response (e.g., servicing) of such a request, and maintain privacy and security (e.g., can anonymize the request such that a third party is prevented from knowing which user is making the request). Additionally, use of a premade network request can ensure that the private software component 430 is limited or prevented from making arbitrary network requests (e.g., arbitrary network requests that could otherwise enable sending of data or use of session timing that would allow the third party software application 420 to infer user information).

The private software component 430 can be capable of delegating share paths, payload information, or both to the private software environment, in which the private software component 430 is executing or to the public software environment, in which the third party software application 420 is executing. In this way, a user that is using a feature provide by the private software component 430 can cause private data accessed or used by the private software component 430 to be shared and linked with another user (e.g., another social networking user) without the third party software application 420 (or the third party that developed it) having knowledge about the share. For instance, a user can interact with a user interface provided by the private software component 430 on the display 408 to trigger a sharing feature provided by the container software application 406, which can permit the user to share protected data, such as user's conversations, media content items, ratings or comments posted on a social network.

According to various embodiments, the private data storage 404 is configured to provide read and write data access to one or more private software environments and to provide write-only data access to one or more public software environments. For some embodiments, the protected data storage 402 is configured to provide read and write data access to one or more container software applications, read data access to one or more private software environments, and deny data access to one or more public software environments.

When the container software application 406 is executed (e.g., launched) on a computing device (e.g., the client device 102), the container software application 406 can execute the third party software application 420 in a public software environment by loading a rendering page (e.g., HTML document) associated with the container software application 406. The rendering page can be served from a private software environment, thereby enabling the third party software application 420 to have at least write data access with respect to the private data storage 404. An iframe (e.g., full screen iframe) of the rendering page can be configured to execute code associated with the third party software application 420 in a public software environment. For instance, the public software environment can comprise an iframe within the third party software application 420. From the public software environment, the third party software application 420 can include (e.g., insert) the private software component 430 in (e.g., include in the HTML DOM associated with the third party software application 420) and communicate with the private software component 430. For example, the private software component 430 can be included in an iframe of the third-party software application. In this way, the third party software application 420 can communicate data to the private software component 430 by writing data to the private data storage 404, and the private software component 430 can be hosted in the private software environment, thereby providing the private software component 430 with read and write access with respect to the private data storage 404. Additionally, the private software component 430 can use one or more APIs (e.g., private APIs) that enable the private software component 430 to request protected data (e.g., sensitive social networking data from backend resources, such as the application servers 112), which can be written to the protected data storage 402 by the container software application 406 and subsequently read by the private software component 430 from the protected data storage 402 preventing the third party software application 420 access to the protected data.

Various embodiments use a web security model (e.g., domain separation according to the model) to facilitate the data access control with respect to the protected data storage 402 and the private data storage 404. For example, the container software application 406 can be associated with (e.g., the container software application 406 includes a component that is retrieved from or generally associated with) a first web address (e.g., Universal Resource Locator (URL), such as https://container.example.com/application-.html) that enables read and write data access with respect to the protected data storage 402, the private software component 430 can be associated with (e.g., the private software component 430 is retrieved from or generally associated with) a second web address (e.g., https://private-component.example.com/application.html) that enables read data access from the protected data storage 402 and read and write data access with respect to the private data storage 404, and the third party software application 420 can be associated with (e.g., the third party software application 420 is retrieved from or generally associated with) a third web address (e.g., https://third-party.example.com/application-.html) that enables write data access to the private data storage 404. In such an example, the first web address can be used as an identifier for the container software application 406, which can be associated with a container software environment. The second web address can be used as an identifier for the private software component 430, which can be associated with a private software environment. Likewise, the third web address can be used as an identifier for the third party software application 420, which can be associated with a public software environment. For some embodiments, each of the container software application 406, the third party software application 420, and the private software component 430 is implemented by a separate web document, such as a HTML document, retrieved from its respective web address (e.g., URL). Additionally, for some embodiments, the web document implementing the container software application 406 comprises an iframe (e.g., HTML iframe) that loads the web document implementing the third party software application 420, and the web document implementing the third party software application 420 comprises an iframe that loads the web document implementing the private software component 430.

During operation, the container software application 406 can write first protected data to the protected data storage 402 and to read second protected data from the protected data storage 402. The first protected data can include, for example, a user's authentication information possessed by the container software application 406, which the container software application 406 can share with the private software component 430 (via the protected data storage 402) to enable the private software component 430 to perform operations or provide services using the user's protected data (e.g., social network data stored on one of the application servers 112). Depending on the embodiment, the container software application 406 can provide the user's authentication information in response to a request from the private software component 430 to the container software application 406 using one or more APIs (e.g., private APIs) accessible to the private software component 430. From within a private software environment of the third party software application 420, the private software component can read third protected data from the protected data storage 402 while preventing the third party software application 420 from accessing the third protected data. From within a private software environment of the third party software application 420, the private software component can write first private data to and read second private data from the private data storage 404. In addition, the third party software application 420 can write third-party data to the private data storage while being denied read access to any data stored on the private data storage 404. By way of the write-only data access to the private data storage 404, the third party software application 420 can communicate data (such as data generated by the third party software application 420 based on some portion of the user input data 410) in one way to the private software component 430 while preventing the third party software application 420 from gaining access to any protected data the private software component 430 may be reading (e.g., using) from the protected data storage 402.

Figure 5:
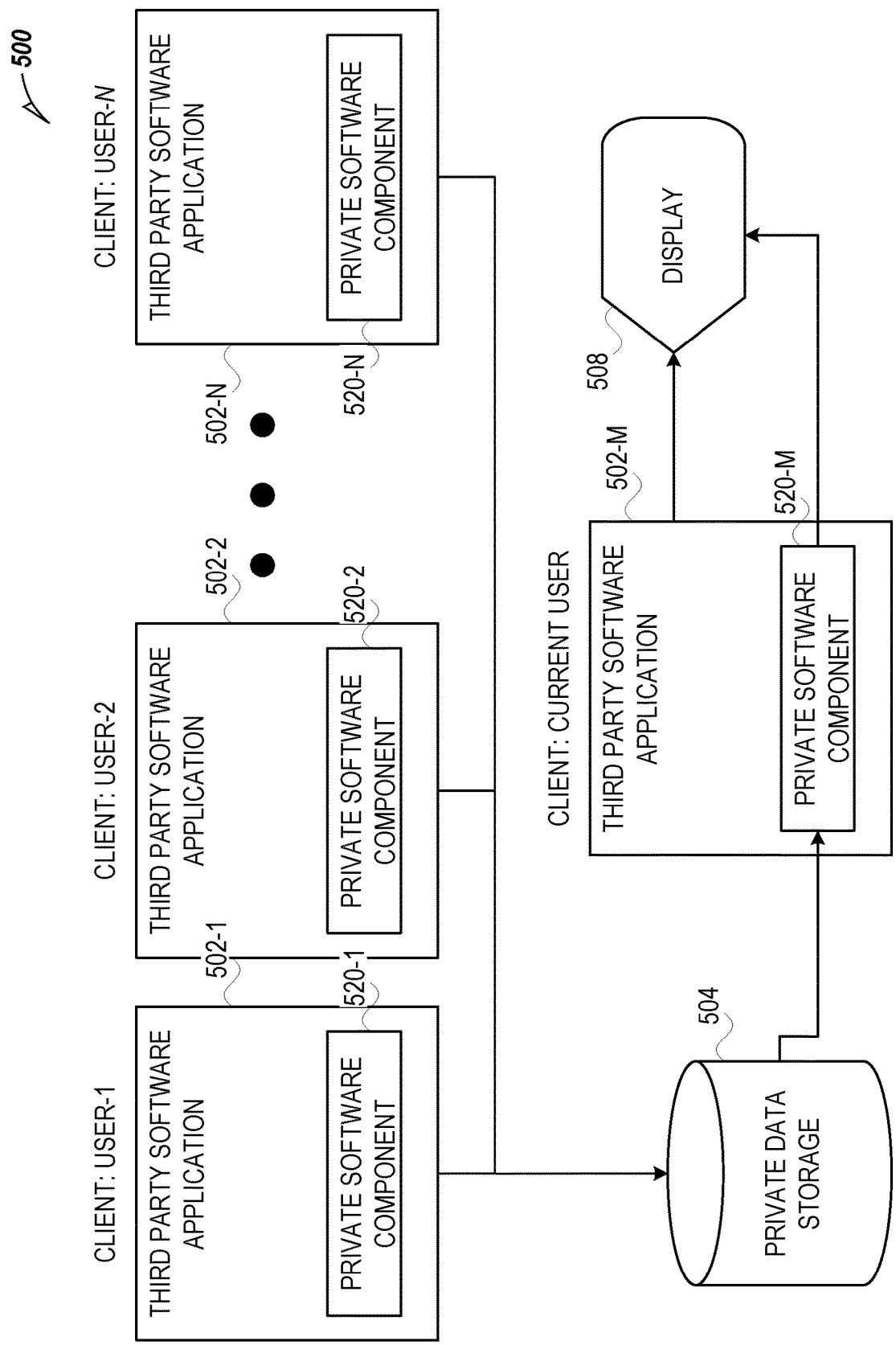
FIG. 5 is a block diagram illustrating an example system where protected data use in a third party software application is used with multiple clients, in accordance with some embodiments.

FIG. 5 is a block diagram illustrating an example system 500 where protected data use in a third-party software application is used with multiple clients, in accordance with some embodiments. As shown, the system 500 includes third party software applications 502-1 through 502-N respectively used by USER-1 through USER-N, and a third party software application 502-M used by CURRENT USER. Each of the third party software applications 502-1 through 502-N and the third party software application 502-M can represent copies of the same third party software application, such as a book review software application. Though not illustrated, each of the third party software applications 502-1 through 502-N and the third party software application 506 can be executed by a respective container software application (e.g., software application 406), such as a social networking software application. Additionally, each of the third party software applications 502-1 through 502-N respectively include private software components 520-1 through 520-N, and the third party software application 502-M includes private software component 520-M. Each of the private software components 520-1 through 520-N and the private software component 520-M can represent copies of the same private software component, such as a component that enables use of user social networking data in connection with a book review software application. Also shown, the system 500 includes a private data storage 504 and a display 508 to which the third party software application 502-M and the private software component 520-M can output data (e.g., rendered data).

According to some embodiments, one or more of USER-1 through USER-N interacts with their respective third party software application (502-1 through 502-N), which can cause their respective third-party software applications to store private data (e.g., book review comments or ratings inputted by one or more of USER-1 through USER-N) to the private data storage 504. Subsequently, the private software component 520-M can read at least some of the private data stored on the private data storage 504 and can merge protected data (e.g., user data) accessed by the private software component 520-M to display to CURRENT USER information (e.g., a user's book review comments with corresponding user information for the user) on the display 508. For instance, the private software component 520-M can do the following: read, from protected data store (not shown), protected data that describe the CURRENT USER's friend list; read, from the private data storage 504, book review data authored by one or more friends on the CURRENT USER's friend list, and display the book review data on the display 508. According to various embodiments, the third-party software application 502-M is prevented from accessing the protected data accessed by the private software component 520-M, the merged data generated by the private software component 520-M, or the information displayed by the private software component 520-M on the display 508.

Figure 6:
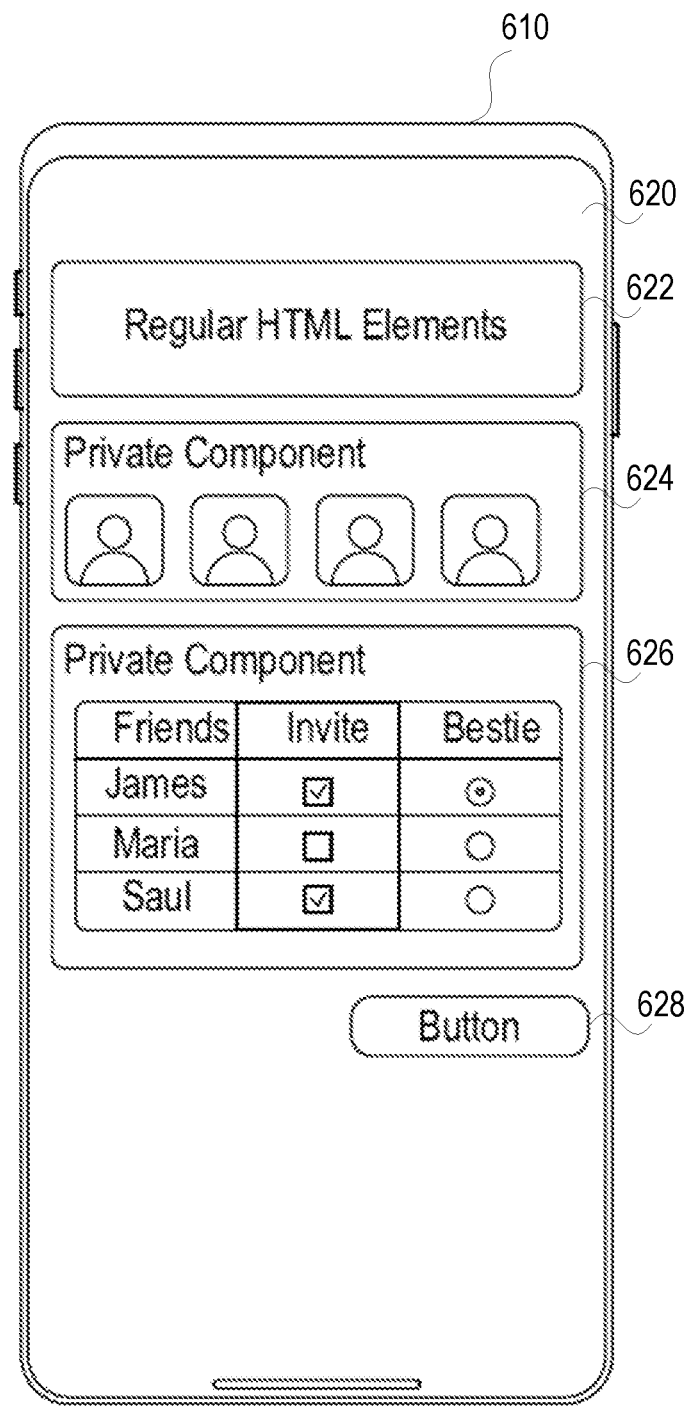
FIG. 6 is diagram illustrating an example user interface generated by a client application that enables protected data use in a third party software application, in accordance with some embodiments.

FIG. 6 is diagram illustrating an example user interface generated by a client application that enables protected data use in a third-party software application, in accordance with some embodiments. In FIG. 6, a mobile device 610, such as a smart phone, comprises or is coupled to a display 620. The mobile device 610 can execute a container software application in a container software environment (e.g., on an operating system of the mobile device 610), where the container software application executes a third party software application in a public software environment of the container software application, and where the third party software application executes each of one or more private software components in separate private software environments of the third-party software application. As shown, the third-party software application causes the generation and presentation of a user interface on the display 620, where the user interface can include one or more regular HTML elements 622, and a graphical button 628 generated based on execution of code of the third-party software application. As also shown, a first private software component executing in a first private software environment of the third-party software application causes generation of a user interface element 624, and a second private software component executing in a second private software environment of the third party software application causes generation of a user interface element 626. The user interface presented on the display 620 can represent display output generated by a display mechanism of the container software application that merges together display outputs of one or more of the container software applications, the third-party software applications, and the first and the second private software components to generate a final display output for the display 620.

Figure 7:
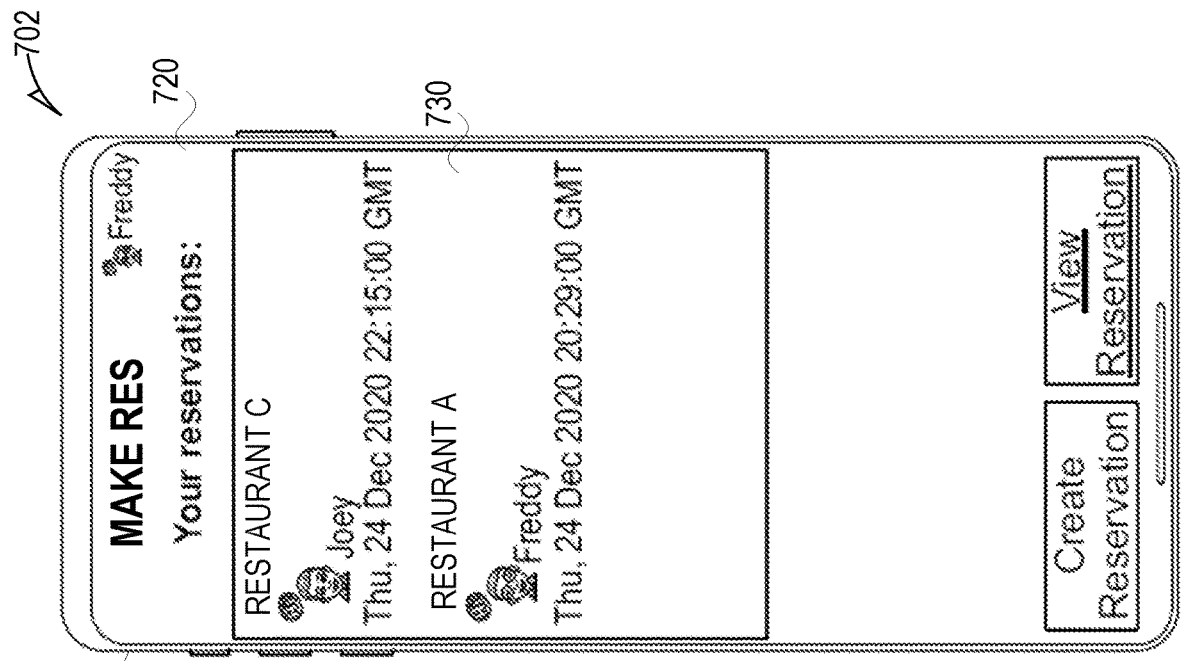
FIG. 7 are diagrams illustrating example user interfaces generated by a client application that enables protected data use in a third-party software application, in accordance with some embodiments.
Figure 7:
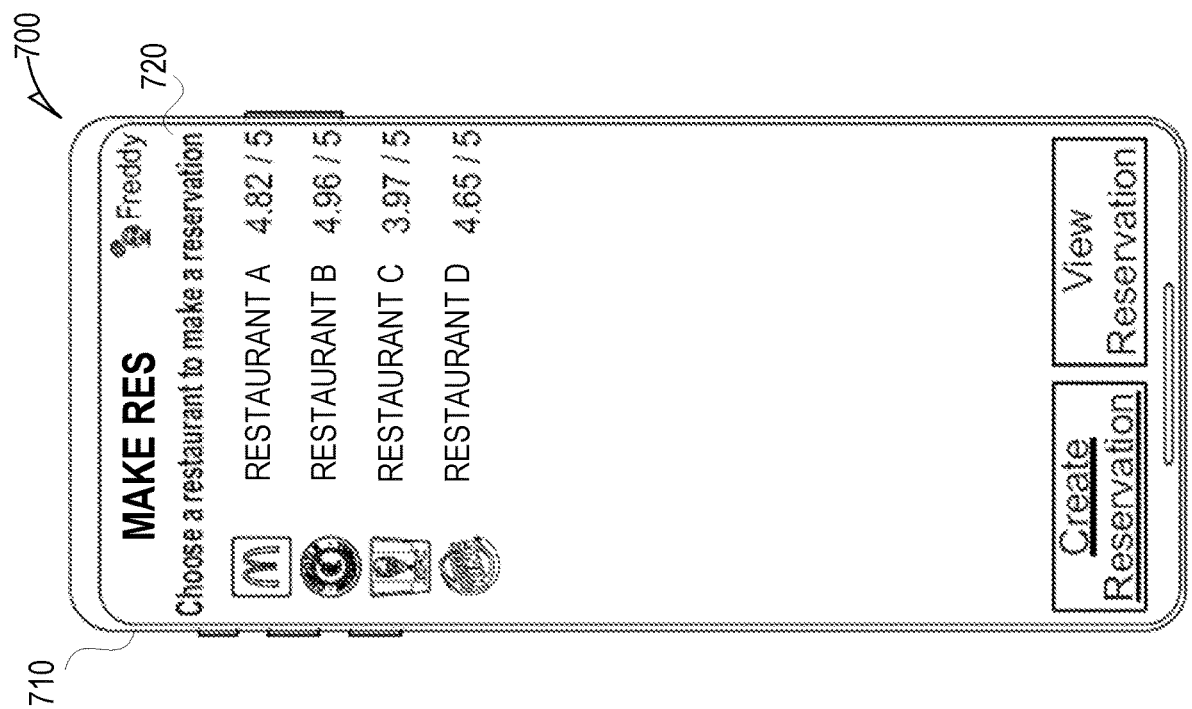

FIG. 7 is a set of diagrams illustrating example user interfaces generated by a client application that enables protected data use in a third-party software application, in accordance with some embodiments. In particular, the user interfaces represent ones generated by a third-party software application configured to share restaurant reservations with friends on a social network. In FIG. 7, a mobile device 710, such as a smart phone, with a display 720. The mobile device 710 can execute a container software application in a container software environment (e.g., on an operating system of the mobile device 710), where the container software application executes the third party software application (for sharing restaurant reservation) in a public software environment of the container software application, and where the third party software application executes a private software component in a private software environment of the third party software application. As shown at 700, the third-party software application causes generation of a user interface on the display 720 that permits a user of the mobile device 710 to generate one or more restaurant reservations, or view/review one or more generated restaurant reservations. The private software component (executed by the third-party software application) can configured to access protected data that describes the user's friend list (e.g., the user's social networking data), and to allow the user of the mobile device 710 to share one or more restaurant reservations generated by the third-party software application with one or more of other users on the user's friend list. As shown at 702, the private software component causes generate and display of a user interface 730 on the display 720, through which the user of the mobile device 710 can interact with features or functionality provided by the private software component. For instance, in FIG. 7, the user interface 730 lists the user's friends in association with restaurant reservations generated by the third-party software application.

Figure 8:
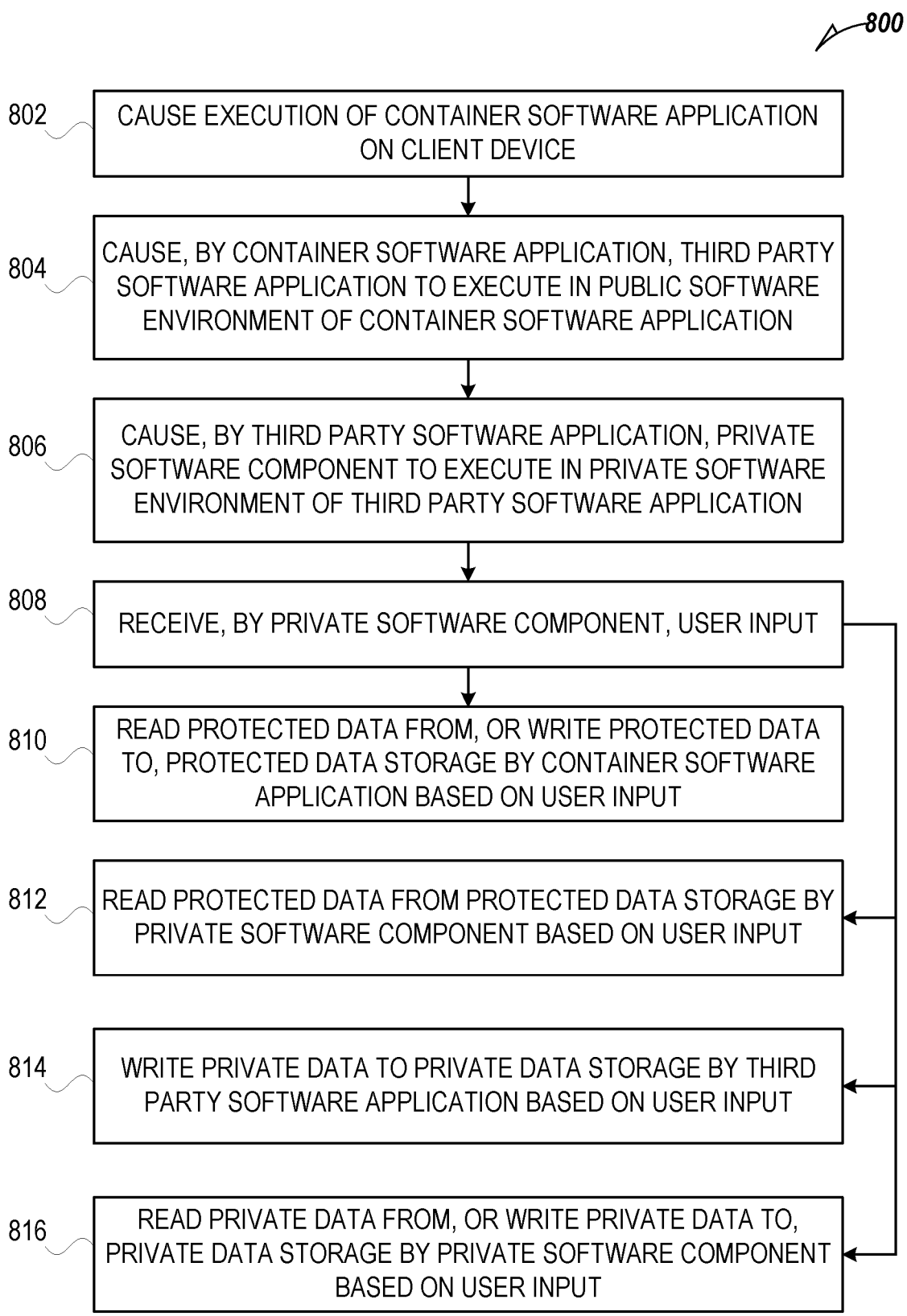
FIG. 8 is a flowchart illustrating an example method for a client application that enables protected data use in a third party software application, in accordance with some embodiments.

FIG. 8 is a flowchart illustrating an example method 800 for a client application that enables protected data use in a third-party software application, in accordance with some embodiments. Various methods described herein with respect to FIG. 8 can be embodied in machine-readable instructions for execution by one or more computer processors such that the operations of the methods may be performed in part or in whole by the client device 102 of FIG.

1. Accordingly, various methods are described herein by way of example with reference to a hardware processor of the client device 102. At least some of the operations of the method 800 can be deployed on various other hardware configurations, and the methods described herein are not intended to be limited to being operated by the client device 102. Though the steps of the methods described herein may be depicted and described in a certain order, the order in which the operations are performed may vary between embodiments. For example, an operation may be performed before, after, or concurrently with another operation. Additionally, the components described with respect to the methods are merely examples of components that may be used with the methods, and other components may also be used, in some embodiments.

Referring now to FIG. 8, at operation 802, the client device 102 causes execution of a container software application (e.g., container software application 406 of FIG. 4) on the client device 102, where the client device 102 comprises a private data storage (e.g., private data storage 404 of FIG. 4) and a protected data storage (e.g., protected data storage 402 of FIG. 4). The private data storage can comprise a database or a datastore, and the protected data storage can comprise a database or a datastore. The public software environment can comprise at a single sandbox environment or a virtual machine. For example, the public software environment can be a HyperText Markup Language (HTML) inline frame (iframe) element of an HTML document (e.g., associated with or implementing the container software application).

At operation 804, the client device 102 causes, by the container software application, a third-party software application (e.g., third party software application 420 of FIG. 4) to execute within a public software environment of the container software application. The private software environment can comprise at a single sandbox environment or a virtual machine. For some embodiments, the private software environment is configured to prevent the third-party software application from accessing any data within the private software environment. For example, the private software environment is a HTML iframe element of an HTML document (e.g., associated with or implementing the third-party software application), which can be embedded in the (first) HTML iframe element of the public software environment. For some embodiments, operation 804 comprises cause a rendering page to load, where the rendering page comprises the public software environment, and the rendering page is configured to load the third party software application in the public software environment.

Thereafter, at operation 806, the client device 102 causes, by the third-party software application, a private software component (e.g., private software component 430 of FIG. 4) to execute within a private software environment of the third-party software application. For some embodiments, the container software application is configured to write first protected data to the protected data storage and to read second protected data from the protected data storage. For some embodiments, the private software component is configured to read third protected data from the protected data storage while preventing the third-party software application from accessing the second protected data. For some embodiments, the private software component is configured to write first private data to and read second private data from the private data storage. Additionally, for some embodiments, the third party software application is configured to write third private data to the private data storage.

In various embodiments, the private software component is compiled separate from the third-party software application. For instance, the private software component can be compiled from a third-party code that defines the private software component, where the third-party code is based on a templating language. The private software component can be compiled, for example, from third-party code that comprises at least one custom tag, where the custom tag corresponds to a defined functionality that causes the first protected data to be written to the protected data storage or causes the second protected data to be read from the protected data storage. After the private software component is compiled, the private software component can be inserted into (or reference by) the third party software application.

Eventually, at operation 808, the client device 102 receives, by the private software component, user input, which can cause the client device 102 to perform a subsequent operation, such as one or more of operations 810 through 816. For instance, at operation 810, the container software application can read protected data from, or write protected data to, the protected data storage based on the user input. At operation 812, the private software component can read protected data from the protected data storage based on the user input. For example, the private software component can cause at least a portion of protected data (read from the protected data storage) to be presented on a display of the client device 102 while preventing the third-party software application access to the at least portion of the third protected data. At operation 814, the third-party software application can write private data to the private data storage based on the user input. For instance, the third-party software application can communicate data to the private software component by writing the private data to the private data storage. For instance, the private data written by the third-party software application, and subsequently read by the private software component, can describe an event (e.g., user event or timer event) detected by the third-party software application. Additionally, or alternatively, at operation 816, the private software component can read private data from, or write private to, the private data storage based on the user input. Depending on the embodiment, the user input can be received through a user interface associated (e.g., provided by) one or more of the container software applications, the third party software application, and the private software component.

Software Architecture

Figure 9:
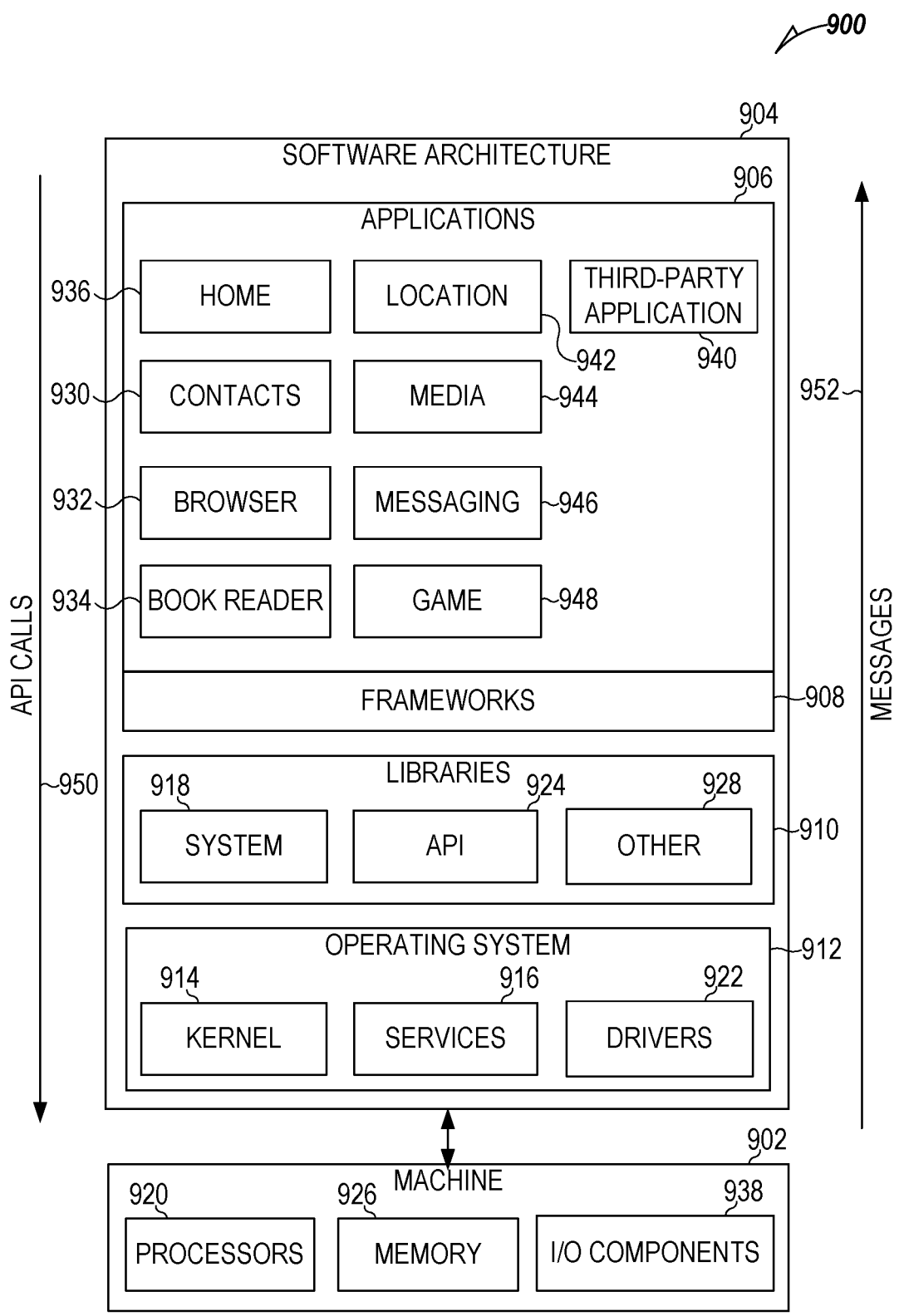
FIG. 9 is a block diagram illustrating a representative software architecture, which may be used in conjunction with various hardware architectures herein described.

FIG. 9 is a block diagram 900 illustrating a representative software architecture 904, which may be used in conjunction with various hardware architectures herein described. The software architecture 904 is supported by hardware such as a machine 902 that includes processors 920, memory 926, and I/O components 938. In this example, the software architecture 904 can be conceptualized as a stack of layers, where each layer provides a particular functionality. The software architecture 904 includes layers such as an operating system 912, libraries 910, frameworks 908, and applications 906. Operationally, the applications 906 invoke API calls 950 through the software stack and receive messages 952 in response to the API calls 950.

The operating system 912 manages hardware resources and provides common services. The operating system 912 includes, for example, a kernel 914, services 916, and drivers 922. The kernel 914 acts as an abstraction layer between the hardware and the other software layers. For example, the kernel 914 provides memory management, processor management (e.g., scheduling), component management, networking, and security settings, among other functionalities. The services 916 can provide other common services for the other software layers. The drivers 922 are responsible for controlling or interfacing with the underlying hardware. For instance, the drivers 922 can include display drivers, camera drivers, BLUETOOTH® or BLUETOOTH® Low Energy drivers, flash memory drivers, serial communication drivers (e.g., USB drivers), WI-FI® drivers, audio drivers, power management drivers, and so forth.

The libraries 910 provide a common low-level infrastructure used by the applications 906. The libraries 910 can include system libraries 918 (e.g., C standard library) that provide functions such as memory allocation functions, string manipulation functions, mathematic functions, and the like. In addition, the libraries 910 can include API libraries 924 such as media libraries (e.g., libraries to support presentation and manipulation of various media formats such as Moving Picture Experts Group-4 (MPEG4), Advanced Video Coding (H.264 or AVC), Moving Picture Experts Group Layer-3 (MP3), Advanced Audio Coding (AAC), Adaptive Multi-Rate (AMR) audio codec, Joint Photographic Experts Group (JPEG or JPG), or Portable Network Graphics (PNG)), graphics libraries (e.g., an OpenGL framework used to render in two dimensions (2D) and three dimensions (3D) in a graphic content on a display), database libraries (e.g., SQLite to provide various relational database functions), web libraries (e.g., WebKit to provide web browsing functionality), and the like. The libraries 910 can also include a wide variety of other libraries 928 to provide many other APIs to the applications 906.

The frameworks 908 provide a common high-level infrastructure that is used by the applications 906. For example, the frameworks 908 provide various GUI functions, high-level resource management, and high-level location services. The frameworks 908 can provide a broad spectrum of other APIs that can be used by the applications 906, some of which may be specific to a particular operating system or platform.

In an example, the applications 906 may include a home application 936, a contacts application 930, a browser application 932, a book reader application 934, a location application 942, a media application 944, a messaging application 946, a game application 948, and a broad assortment of other applications such as a third-party application 940. The applications 906 are programs that execute functions defined in the programs. Various programming languages can be employed to create one or more of the applications 906, structured in a variety of manners, such as object-oriented programming languages (e.g., Objective-C, Java, or C++) or procedural programming languages (e.g., C or assembly language). In a specific example, the third-party application 940 (e.g., an application developed using the ANDROID™ or IOS™ software development kit (SDK) by an entity other than the vendor of the particular platform) may be mobile software running on a mobile operating system such as IOS™ ANDROID™, WINDOWS® Phone, or another mobile operating system. In this example, the third-party application 940 can invoke the API calls 950 provided by the operating system 912 to facilitate functionality described herein.

Processing Components

Figure 10:
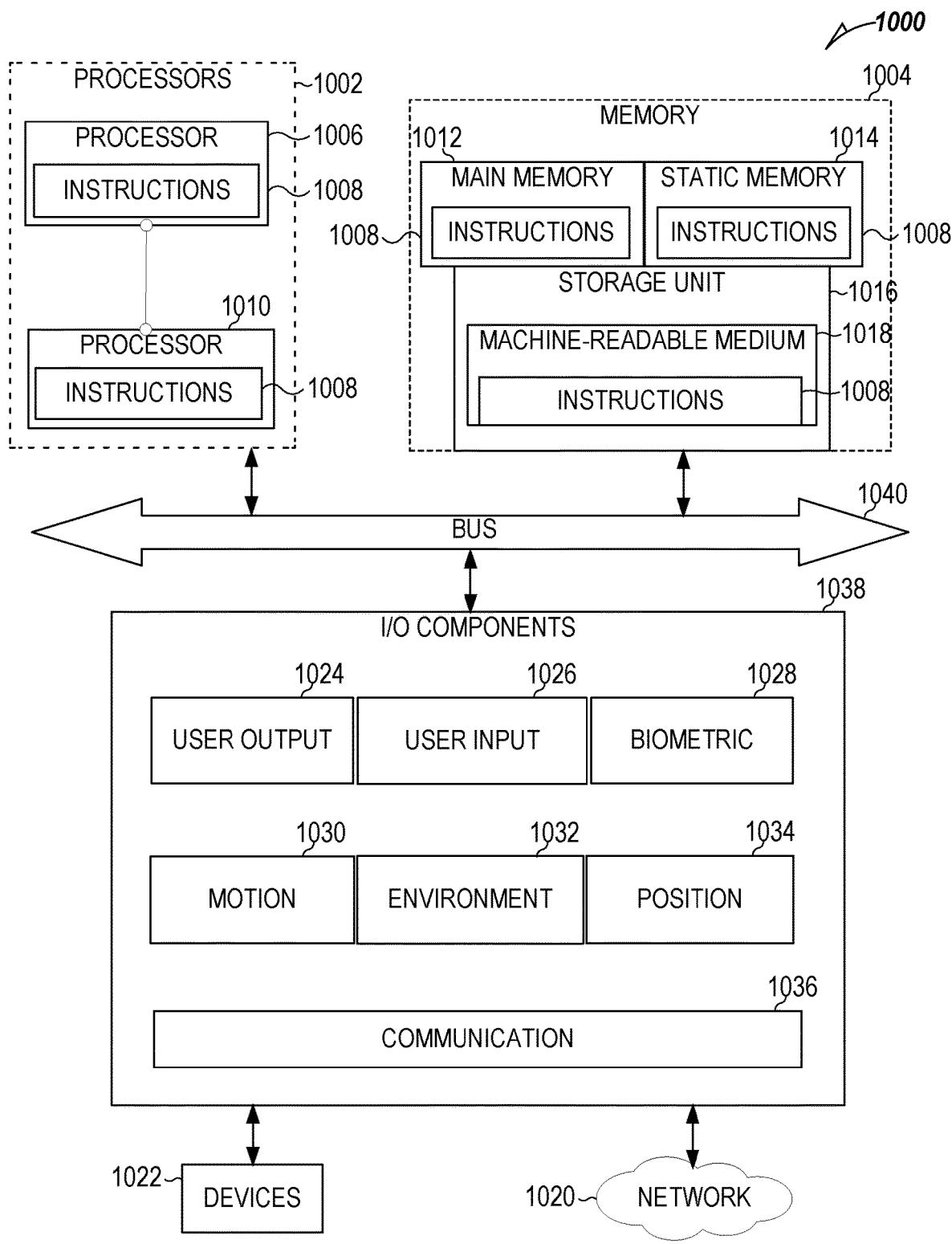
FIG. 10 is a block diagram illustrating components of a machine, according to some embodiments, able to read instructions from a machine-readable medium (e.g., a machine-readable storage medium) and perform any one or more of the methodologies discussed herein.

FIG. 10 is a block diagram illustrating components of a machine 1000, according to some embodiments, able to read instructions from a machine-readable medium (e.g., a computer-readable storage medium) and perform any one or more of the methodologies discussed herein. Specifically, FIG. 10 shows a diagrammatic representation of the machine 1000 in the example form of a computer system, within which instructions 1008 (e.g., software, a program, an application, an applet, an app, or other executable code) for causing the machine 1000 to perform any one or more of the methodologies discussed herein may be executed. As such, the instructions 1008 may be used to implement modules or components described herein. The instructions 1008 transform the general, non-programmed machine 1000 into a particular machine 1000 programmed to carry out the described and illustrated functions in the manner described. In alternative embodiments, the machine 1000 operates as a standalone device or may be coupled (e.g., networked) to other machines. In a networked deployment, the machine 1000 may operate in the capacity of a server machine or a client machine in a server-client network environment, or as a peer machine in a peer-to-peer (or distributed) network environment. The machine 1000 may comprise, but not be limited to, a server computer, a client computer, a personal computer (PC), a tablet computer, a laptop computer, a netbook, a set-top box (STB), a personal digital assistant (PDA), an entertainment media system, a cellular telephone, a smart phone, a mobile device, a wearable device (e.g., a smart watch), a smart home device (e.g., a smart appliance), other smart devices, a web appliance, a network router, a network switch, a network bridge, or any machine capable of executing the instructions 1008, sequentially or otherwise, that specify actions to be taken by machine 1000. Further, while only a single machine 1000 is illustrated, the term "machine" shall also be taken to include a collection of machines that individually or jointly execute the instructions 1008 to perform any one or more of the methodologies discussed herein.

The machine 1000 may include processors 1002 (including processor 1006 and 1010), memory 1004, and I/O components 1038, which may be configured to communicate with each other such as via a bus 1040. The memory 1004 may include a main memory 1012, a static memory 1014, or a storage unit 1016 (which includes machine-readable medium 1018) accessible to the processors 1002 such as via the bus 1040. The storage unit 1016, main memory 1012, and static memory 1014 store the instructions 1008 embodying any one or more of the methodologies or functions described herein. The instructions 1008 may also reside, completely or partially, within the main memory 1012, within the static memory 1014, within the storage unit 1016, within at least one of the processors 1002 (e.g., within the processor's cache memory), or any suitable combination thereof, during execution thereof by the machine 1000. Accordingly, the main memory 1012, the static memory 1014, the storage unit 1016, and the memory of processors 1002 are examples of machine-readable media.

The I/O components 1038 may include a wide variety of components to receive input, provide output, produce output, transmit information, exchange information, capture measurements, and so on. The specific I/O components 1038 that are included in a particular machine 1000 will depend on the type of machine. For example, portable machines such as mobile phones will likely include a touch input device or other such input mechanisms, while a headless server machine will likely not include such a touch input device. It will be appreciated that the I/O components 1038 may include many other components that are not shown in FIG. 10. The I/O components 1038 are grouped according to functionality merely for simplifying the following discussion and the grouping is in no way limiting. In various embodiments, the I/O components 1038 may include user output components 1024 and user input components 1026.

The user output components 1024 may include visual components (e.g., a display such as a plasma display panel (PDP), a light emitting diode (LED) display, a liquid crystal display (LCD), a projector, or a cathode ray tube (CRT)), acoustic components (e.g., speakers), haptic components (e.g., a vibratory motor, resistance mechanisms), other signal generators, and so forth. The user input components 1026 may include alphanumeric input components (e.g., a keyboard, a touch screen configured to receive alphanumeric input, a photo-optical keyboard, or other alphanumeric input components), point based input components (e.g., a mouse, a touchpad, a trackball, a joystick, a motion sensor, or other pointing instrument), tactile input components (e.g., a physical button, a touch screen that provides location or force of touches or touch gestures, or other tactile input components), audio input components (e.g., a microphone), and the like.

The biometric components 1028 may include components to detect expressions (e.g., hand expressions, facial expressions, vocal expressions, body gestures, or eye tracking), measure bio signals (e.g., blood pressure, heart rate, body temperature, perspiration, or brain waves), identify a person (e.g., voice identification, retinal identification, facial identification, fingerprint identification, or electroencephalogram-based identification), and the like. The motion components 1030 may include acceleration sensor components (e.g., accelerometer), gravitation sensor components, rotation sensor components (e.g., gyroscope), and so forth. The environment components 1032 may include, for example, illumination sensor components (e.g., photometer), temperature sensor components (e.g., one or more thermometer that detect ambient temperature), humidity sensor components, pressure sensor components (e.g., barometer), acoustic sensor components (e.g., one or more microphones that detect background noise), proximity sensor components (e.g., infrared sensors that detect nearby objects), gas sensors (e.g., gas detection sensors to detection concentrations of hazardous gases for safety or to measure pollutants in the atmosphere), or other components that may provide indications, measurements, or signals corresponding to a surrounding physical environment. The position components 1034 may include location sensor components (e.g., a Global Position system (GPS) receiver component), altitude sensor components (e.g., altimeters or barometers that detect air pressure from which altitude may be derived), orientation sensor components (e.g., magnetometers), and the like.

Communication may be implemented using a wide variety of technologies. The communication components 1036 can be operable to couple the machine 1000 to a network 1020 or devices 1022. For example, the communication components 1036 may include a network interface component or other suitable device to interface with the network 1020. In further examples, the communication components 1036 may include wired communication components, wireless communication components, cellular communication components, Near Field Communication (NFC) components, Bluetooth® components (e.g., Bluetooth® Low Energy), Wi-Fi® components, and other communication components to provide communication via other modalities. The devices 1022 may be another machine or any of a wide variety of peripheral devices (e.g., a peripheral device coupled via a Universal Serial Bus (USB)).

Moreover, the communication components 1036 may detect identifiers or include components operable to detect identifiers. For example, the communication components 1036 may include Radio Frequency Identification (RFID) tag reader components, NFC smart tag detection components, optical reader components (e.g., an optical sensor to detect one-dimensional bar codes such as Universal Product Code (UPC) bar code, multi-dimensional bar codes such as Quick Response (QR) code, Aztec code, Data Matrix, Dataglyph, MaxiCode, PDF417, Ultra Code, UCC RSS-2D bar code, and other optical codes), or acoustic detection components (e.g., microphones to identify tagged audio signals). In addition, a variety of information may be derived via the communication components 1036, such as, location via Internet Protocol (IP) geo-location, location via Wi-Fi® signal triangulation, location via detecting a NFC beacon signal that may indicate a particular location, and so forth.

Throughout this specification, plural instances may implement components, operations, or structures described as a single instance. Although individual operations of one or more methods are illustrated and described as separate operations, one or more of the individual operations may be performed concurrently, and nothing requires that the operations be performed in the order illustrated. Structures and functionality presented as separate components in example configurations may be implemented as a combined structure or component. Similarly, structures and functionality presented as a single component may be implemented as separate components. These and other variations, modifications, additions, and improvements fall within the scope of the subject matter herein.

Although an overview of various embodiments has been described with reference to specific embodiments, various modifications and changes may be made to these embodiments without departing from the broader scope of embodiments of the present disclosure.

The embodiments illustrated herein are described in sufficient detail to enable those skilled in the art to practice the teachings disclosed. Other embodiments may be used and derived therefrom, such that structural and logical substitutions and changes may be made without departing from the scope of this disclosure. The detailed description, therefore, is not to be taken in a limiting sense, and the scope of various embodiments is defined only by the appended claims, along with the full range of equivalents to which such claims are entitled.

As used herein, the term "or" may be construed in either an inclusive or exclusive sense. The terms "a" or "an" should be read as meaning "at least one," "one or more," or the like. The use of words and phrases such as "one or more," "at least," "but not limited to," or other like phrases shall not be read to mean that the narrower case is intended or required in instances where such broadening phrases may be absent.

Boundaries between various resources, operations, components, modules, engines, and data stores are somewhat arbitrary, and particular operations are illustrated in a context of specific illustrative configurations. Other allocations of functionality are envisioned and may fall within a scope of various embodiments of the present disclosure. In general, structures and functionality presented as separate resources in the example configurations may be implemented as a combined structure or resource. Similarly, structures and functionality presented as a single resource may be implemented as separate resources. These and other variations, modifications, additions, and improvements fall within a scope of embodiments of the present disclosure as represented by the appended claims. The specification and drawings are, accordingly, to be regarded in an illustrative rather than a restrictive sense.

The description above includes systems, methods, devices, instructions, and computer media (e.g., computing machine program products) that embody illustrative embodiments of the disclosure. In the description, for the purposes of explanation, numerous specific details are set forth in order to provide an understanding of various embodiments of the inventive subject matter. It will be evident, however, to those skilled in the art, that embodiments of the inventive subject matter may be practiced without these specific details. In general, well-known instruction instances, protocols, structures, and techniques are not necessarily shown in detail.

Glossary

"Carrier signal" refers to any intangible medium that is capable of storing, encoding, or carrying instructions for execution by the machine, and includes digital or analog communications signals or other intangible media to facilitate communication of such instructions. Instructions may be transmitted or received over a network using a transmission medium via a network interface device.

"Client device" refers to any machine that interfaces to a communications network to obtain resources from one or more server systems or other client devices. A client device may be, but is not limited to, a mobile phone, desktop computer, laptop, portable digital assistants (PDAs), smartphones, tablets, ultrabooks, netbooks, laptops, multi-processor systems, microprocessor-based or programmable consumer electronics, game consoles, set-top boxes, or any other communication device that a user may use to access a network.

"Communication network" refers to one or more portions of a network that may be an ad hoc network, an intranet, an extranet, a virtual private network (VPN), a local area network (LAN), a wireless LAN (WLAN), a wide area network (WAN), a wireless WAN (WWAN), a metropolitan area network (MAN), the Internet, a portion of the Internet, a portion of the Public Switched Telephone Network (PSTN), a plain old telephone service (POTS) network, a cellular telephone network, a wireless network, a Wi-Fi® network, another type of network, or a combination of two or more such networks. For example, a network or a portion of a network may include a wireless or cellular network and the coupling may be a Code Division Multiple Access (CDMA) connection, a Global System for Mobile communications (GSM) connection, or other types of cellular or wireless coupling. In this example, the coupling may implement any of a variety of types of data transfer technology, such as Single Carrier Radio Transmission Technology (1×RTT), Evolution-Data Optimized (EVDO) technology, General Packet Radio Service (GPRS) technology, Enhanced Data rates for GSM Evolution (EDGE) technology, third Generation Partnership Project (3GPP) including 3G, fourth generation wireless (4G) networks, Universal Mobile Telecommunications System (UMTS), High Speed Packet Access (HSPA), Worldwide Interoperability for Microwave Access (WiMAX), Long Term Evolution (LTE) standard, others defined by various standard-setting organizations, other long-range protocols, or other data transfer technology.

"Component" refers to a device, physical entity, or logic having boundaries defined by function or subroutine calls, branch points, APIs, or other technologies that provide for the partitioning or modularization of particular processing or control functions. Components may be combined via their interfaces with other components to carry out a machine process. A component may be a packaged functional hardware unit designed for use with other components and a part of a program that usually performs a particular function of related functions. Components may constitute either software components (e.g., code embodied on a machine-readable medium) or hardware components. A "hardware component" is a tangible unit capable of performing certain operations and may be configured or arranged in a certain physical manner. In various examples, one or more computer systems (e.g., a standalone computer system, a client computer system, or a server computer system) or one or more hardware components of a computer system (e.g., a processor or a group of processors) may be configured by software (e.g., an application or application portion) as a hardware component that operates to perform certain operations as described herein. A hardware component may also be implemented mechanically, electronically, or any suitable combination thereof. For example, a hardware component may include dedicated circuitry or logic that is permanently configured to perform certain operations. A hardware component may be a special-purpose processor, such as a field-programmable gate array (FPGA) or an application specific integrated circuit (ASIC). A hardware component may also include programmable logic or circuitry that is temporarily configured by software to perform certain operations. For example, a hardware component may include software executed by a general-purpose processor or other programmable processor. Once configured by such software, hardware components become specific machines (or specific components of a machine) uniquely tailored to perform the configured functions and are no longer general-purpose processors. It will be appreciated that the decision to implement a hardware component mechanically, in dedicated and permanently configured circuitry, or in temporarily configured circuitry (e.g., configured by software), may be driven by cost and time considerations. Accordingly, the phrase "hardware component" (or "hardware-implemented component") should be understood to encompass a tangible entity, be that an entity that is physically constructed, permanently configured (e.g., hardwired), or temporarily configured (e.g., programmed) to operate in a certain manner or to perform certain operations described herein. Considering examples in which hardware components are temporarily configured (e.g., programmed), each of the hardware components need not be configured or instantiated at any one instance in time. For example, where a hardware component comprises of a general-purpose processor configured by software to become a special-purpose processor, the general-purpose processor may be configured as respectively different special-purpose processors (e.g., comprising different hardware components) at different times. Software accordingly configures a particular processor or processors, for example, to constitute a particular hardware component at one instance of time and to constitute a different hardware component at a different instance of time. Hardware components can provide information to, and receive information from, other hardware components. Accordingly, the described hardware components may be regarded as being communicatively coupled. Where multiple hardware components exist contemporaneously, communications may be achieved through signal transmission (e.g., over appropriate circuits and buses) between or among two or more of the hardware components. In examples in which multiple hardware components are configured or instantiated at different times, communications between such hardware components may be achieved, for example, through the storage and retrieval of information in memory structures to which the multiple hardware components have access. For example, one hardware component may perform an operation and store the output of that operation in a memory device to which it is communicatively coupled. A further hardware component may then, later, access the memory device to retrieve and process the stored output. Hardware components may also initiate communications with input or output devices, and can operate on a resource (e.g., a collection of information). The various operations of example methods described herein may be performed, at least partially, by one or more processors that are temporarily configured (e.g., by software) or permanently configured to perform the relevant operations. Whether temporarily or permanently configured, such processors may constitute processor-implemented components that operate to perform one or more operations or functions described herein. As used herein, "processor-implemented component" refers to a hardware component implemented using one or more processors. Similarly, the methods described herein may be at least partially processor-implemented, with a particular processor or processors being an example of hardware. For example, at least some of the operations of a method may be performed by one or more processors 1002 or processor-implemented components. Moreover, the one or more processors may also operate to support performance of the relevant operations in a "cloud computing" environment or as a "software as a service" (SaaS). For example, at least some of the operations may be performed by a group of computers (as examples of machines including processors), with these operations being accessible via a network (e.g., the Internet) and via one or more appropriate interfaces (e.g., an API). The performance of certain operations may be distributed among the processors, not only residing within a single machine, but deployed across a number of machines. In some examples, the processors or processor-implemented components may be in a single geographic location (e.g., within a home environment, an office environment, or a server farm). In other examples, the processors or processor-implemented components may be distributed across a number of geographic locations.

"Computer-readable storage medium" refers to both machine-storage media and transmission media. Thus, the terms include both storage devices/media and carrier waves/modulated data signals. The terms "machine-readable medium," "computer-readable medium" and "device-readable medium" mean the same thing and may be used interchangeably in this disclosure.

"Ephemeral message" refers to a message that is accessible for a time-limited duration. An ephemeral message may be a text, an image, a video and the like. The access time for the ephemeral message may be set by the message sender. Alternatively, the access time may be a default setting, or a setting specified by the recipient. Regardless of the setting technique, the message is transitory.

"Machine storage medium" refers to a single or multiple storage devices and media (e.g., a centralized or distributed database, and associated caches and servers) that store executable instructions, routines and data. The term shall accordingly be taken to include, but not be limited to, solid-state memories, and optical and magnetic media, including memory internal or external to processors. Specific examples of machine-storage media, computer-storage media and device-storage media include non-volatile memory, including by way of example semiconductor memory devices, (e.g., erasable programmable read-only memory (EPROM)), electrically erasable programmable read-only memory (EEPROM), FPGA, and flash memory devices; magnetic disks such as internal hard disks and removable disks; magneto-optical disks; and CD-ROM and DVD-ROM disks. The terms "machine-storage medium," "device-storage medium," "computer-storage medium" mean the same thing and may be used interchangeably in this disclosure. The terms "machine-storage media," "computer-storage media," and "device-storage media" specifically exclude carrier waves, modulated data signals, and other such media, at least some of which are covered under the term "signal medium." A "machine-readable medium" can refer to a single storage apparatus or device, as well as "cloud-based" storage systems or storage networks that include multiple storage apparatus or devices.

"Non-transitory computer-readable storage medium" refers to a tangible medium that is capable of storing, encoding, or carrying the instructions for execution by a machine.

"Signal medium" refers to any intangible medium that is capable of storing, encoding, or carrying the instructions for execution by a machine and includes digital or analog communications signals or other intangible media to facilitate communication of software or data. The term "signal medium" shall be taken to include any form of a modulated data signal, carrier wave, and so forth. The term "modulated data signal" means a signal that has one or more of its characteristics set or changed in such a matter as to encode information in the signal. The terms "transmission medium" and "signal medium" mean the same thing and may be used interchangeably in this disclosure.

What is claimed is:

1. A system comprising:
a private data storage configured to provide:
read and write data access to one or more private software environments within a container software application; and
write-only data access to all public software environments within the container software application;
a protected data storage configured to provide:
read and write data access to the container software application;
read data access to the one or more private software environments within the container software application; and
deny data access to all public software environments within the container software application;
one or more hardware processors; and
one or more machine-readable media storing instructions that, when executed by the one or more hardware processors, cause the system to perform operations comprising:
causing execution of the container software application;
causing the container software application to execute a third-party software application in a public software environment within the container software application, the public software environment being a first Hyper-Text Markup Language (HTML) inline frame (iframe) element; and
causing the third-party software application to execute a private software component in a private software environment within the third-party software application, the container software application being configured to write first protected data to the protected data storage and to read second protected data from the protected data storage, the private software component being a second HTML iframe element embedded in the first HTML iframe element, the private software component being configured to read third protected data from the protected data storage while preventing the third-party software application from accessing the third protected data being read by the private software component, the private software component being configured to write first private data to and read second private data from the private data storage, and the third-party software application being configured to write third private data to the private data storage.

2. The system of claim 1, comprising:
a display, the private software component being configured to cause at least a portion of the third protected data to be presented on the display while preventing the third-party software application access to the at least portion of the third protected data.

3. The system of claim 1, wherein the private data storage comprises a database.

4. The system of claim 1, wherein the protected data storage comprises a database.

5. The system of claim 1, wherein the third-party software application communicates data to the private software component by writing the third private data to the private data storage.

6. The system of claim 1, comprising:
a display, the private software component being configured to cause a user interface to be presented on the display and to receive a user input through the user interface.

7. The system of claim 1, wherein the second private data describes an event detected by the third-party software application.

8. The system of claim 1, wherein the private software environment is configured to prevent the third-party software application from accessing any data in the private software environment.

9. The system of claim 1, wherein the private software component is compiled separate from the third-party software application.

10. The system of claim 1, wherein the private software component is compiled from third-party code that defines the private software component, the third-party code being based on a templating language.

11. The system of claim 10, wherein the private software component is inserted into the third-party software application after the private software component is compiled.

12. The system of claim 1, wherein the private software component is compiled from third-party code that comprises at least one custom tag, the at least one custom tag corresponding to a defined functionality that causes the first protected data to be written to the protected data storage or causes the second protected data to be read from the protected data storage.

13. The system of claim 1, wherein causing the container software application to execute the third-party software application in the public software environment comprises:
causing a rendering page to load, the rendering page comprising the public software environment, the rendering page configured to load the third-party software application in the public software environment.

14. A method comprising:
causing, by one or more hardware processors of a client device, execution of a container software application on the client device, the client device comprising a private data storage and a protected data storage, the protected data storage being configured to provide:
read and write data access to one or more private software environments within the container software application; and
write-only data access to all public software environments within the container software application;
the protected data storage being configured to provide:
read and write data access to the container software application;

read data access to the one or more private software environments within the container software application; and
deny data access to all public software environments within the container software application;
causing the container software application to execute a third-party software application within a public software environment within the container software application, the public software environment being a first HyperText Markup Language (HTML) inline frame (iframe) element; and
causing the third-party software application to execute a private software component within a private software environment within the third-party software application, the container software application being configured to write first protected data to the protected data storage and to read second protected data from the protected data storage, the private software component being a second HTML iframe element embedded in the first HTML iframe element, the private software component being configured to read third protected data from the protected data storage while preventing the third-party software application from accessing the third protected data being read by the private software component, the private software component being configured to write first private data to and read second private data from the private data storage, and the third-party software application being configured to write third private data to the private data storage.

15. The method of claim 14, comprising:
causing at least a portion of the third protected data to be presented on a display while preventing the third-party software application access to the at least portion of the third protected data.

16. The method of claim 14, wherein the third-party software application communicates data to the private software component by writing the third private data to the private data storage.

17. The method of claim 14, wherein the private software environment is configured to prevent the third-party software application from accessing any data in the private software environment.

18. The method of claim 14, wherein the private software component is compiled separate from the third-party software application.

19. The method of claim 14, wherein the private software component is compiled from third-party code that defines the private software component, the third-party code being based on a templating language.

20. A non-transitory machine-readable medium storing instructions that, when executed by one or more hardware processors of a client device, cause the client device to perform operations comprising:
causing execution of a container software application on the client device, the client device comprising a private data storage and a protected data storage, the protected data storage being configured to provide:
read and write data access to one or more private software environments within the container software application; and
write-only data access to public software environments within the container software application;
the protected data storage being configured to provide:
read and write data access to the container software application;

read data access to the one or more private software environments within the container software application; and deny data access to all public software environments within the container software application;

causing the container software application to execute a third-party software application within a public software environment within the container software application, the public software environment being a first HyperText Markup Language (HTML) inline frame (iframe) element; and causing the third-party software application to execute a private software component within a private software environment within the third-party software application, the container software application being configured to write first protected data to the protected data storage and to read second protected data from the protected data storage, the private software component being a second HTML iframe element embedded in the first HTML iframe element, the private software component being configured to read third protected data from the protected data storage while preventing the third-party software application from accessing the third protected data being read by the private software component, the private software component being configured to write first private data to and read second private data from the private data storage, and the third-party software application being configured to write third private data to the private data storage.

* * * * *